(12) United States Patent
Abbott et al.

(10) Patent No.: US 10,023,258 B2
(45) Date of Patent: *Jul. 17, 2018

(54) MOTORCYCLE HAVING INTERACTIVE LEAN CONTROL

(71) Applicants: James Wesley Abbott, Bacliff, TX (US); Bailey H. Jones, Bacliff, TX (US)

(72) Inventors: James Wesley Abbott, Bacliff, TX (US); Bailey H. Jones, Bacliff, TX (US)

(73) Assignee: TerraCraft Motors Inc., Seabrook, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/422,429

(22) Filed: Feb. 1, 2017

(65) Prior Publication Data

US 2017/0334502 A1    Nov. 23, 2017

Related U.S. Application Data

(63) Continuation of application No. 14/797,139, filed on Jul. 12, 2015, now Pat. No. 9,555,849.

(51) Int. Cl.
| | |
|---|---|
| *G06F 17/10* | (2006.01) |
| *G06G 7/48* | (2006.01) |
| *B62K 5/10* | (2013.01) |
| *B62K 5/027* | (2013.01) |

(52) U.S. Cl.
CPC ............... *B62K 5/10* (2013.01); *B62K 5/027* (2013.01)

(58) Field of Classification Search
CPC ...... B62K 5/027; G01M 1/125; G01M 1/127; G01G 19/07; G06G 7/70; B60T 2230/03
USPC ........................................................ 701/124
See application file for complete search history.

*Primary Examiner* — Maceeh Anwari
(74) *Attorney, Agent, or Firm* — Michael G. Smith, Esq.

(57) ABSTRACT

Systems, methods and apparatus are provided through which in some implementations a motorized tricycle includes a lean mechanism and an active system that is operably coupled to the lean mechanism that receives an signal indicative of an interaction with human, that is operable to detect a lean of the body of the human and that is operable to receive a sensed movement on the seat via multisensory devices, and to generate and send a signal to the lean mechanism from the signal, the lean and the sensed movement.

14 Claims, 47 Drawing Sheets

FIG. 39    3900

MOTORCYCLE HAVING INTERACTIVE LEAN CONTROL

FIELD

This disclosure relates generally to vehicles and more particularly to two, three and four-wheeled vehicles.

BACKGROUND

The three wheeler market kit/conversion industry is predominantly focused on vehicles having one front-wheel and two rear-wheels (1F2R), with a rapidly emerging focus on vehicles with two front-wheels and one rear-wheel (2F1R) for customs and production vehicle manufacturers. The market segment for conversions is nascent and includes a variety of potentially competing platforms, such as delta trikes; 'ride-on' reverse trikes, and open cockpit, 'side-by-side' reverse trikes. Current designs of three-wheeled motorcycles focus more on the 1F2R designs. The "delta trike" is a popular design that exemplifies this layout. However, the one-front-two rear design is inherently unstable and exhibits poor handling characteristics. However, none of the conventional designs are even robustly stable. The need for a stable design for a 1F2R or 2F1R vehicle has been recognized and long felt for over 80 years, and has been characterized by failure by many others to design a stable 1F2R or 1F2R vehicle using other designs.

BRIEF DESCRIPTION

The above-mentioned shortcomings, disadvantages and problems are addressed herein, which will be understood by reading and studying the following specification.

In one aspect, a motorized tricycle includes a lean mechanism and an active system that is operably coupled to the lean mechanism that receives an signal indicative of an interaction with human, that is operable to detect a lean of the body of the human and that is operable to receive a sensed movement on the seat via multisensory devices, and to generate and send a signal to the lean mechanism from the signal, the lean and the sensed movement.

The disclosure herein is applicable to, and can be implemented on, two front wheels and one rear wheel (2F1R) 'reverse tricycle' vehicles, one front wheel and two rear wheels (1F2R) 'tricycle' vehicles, one front wheel and one rear wheel (1F1R) 'motorcycle' vehicles and two front wheel and two rear wheel (2F2R) 'quad' vehicles. Apparatus, systems, and methods of varying scope are described herein. In addition to the aspects and advantages described in this summary, further aspects and advantages will become apparent by reference to the drawings and by reading the detailed description that follows.

DETAILED DESCRIPTION

System Level Overview

Figure 1:
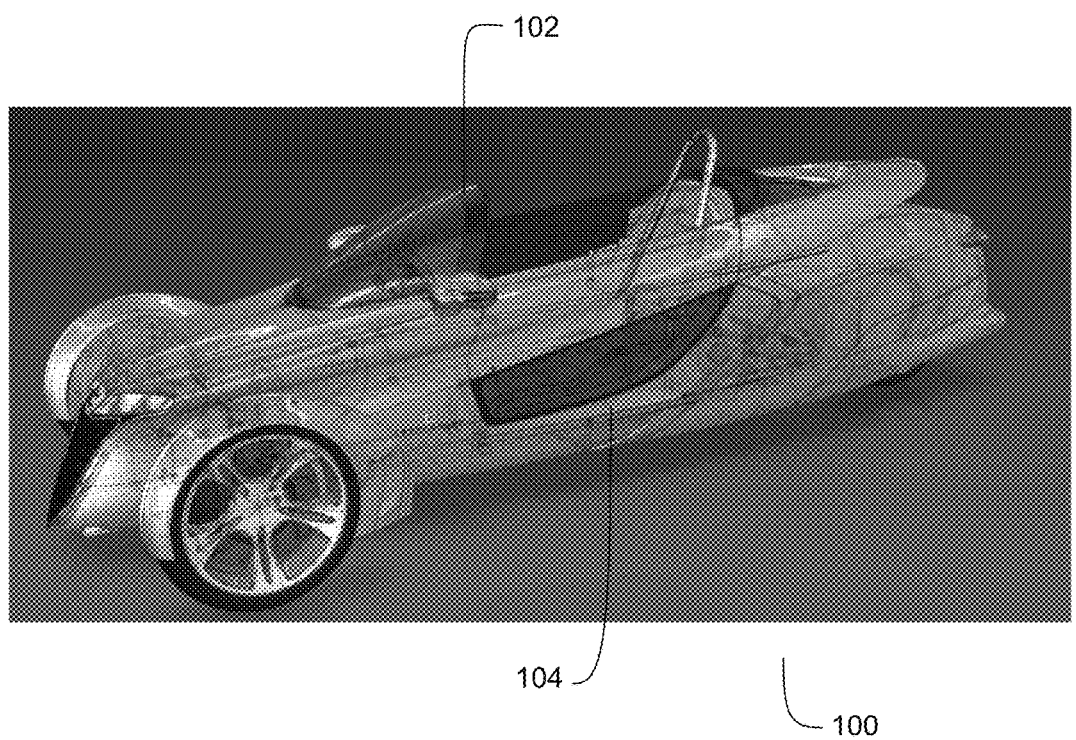
FIG. 1 is an isometric drawing of a three-wheeled two-front-one-rear tricycle with retractable cockpit canopy system, according to an implementation.

FIG. 1 is an isometric drawing of a three-wheeled two-front-one-rear tricycle 100 with retractable cockpit canopy system 102, according to an implementation. The vehicle is a versatile platform allowing multiple configurations and customizations to target varying consumer preferences. Entirely unique to the three-wheeled two-front-one-rear tricycle 100 is a retractable cockpit canopy system 102, enabling the vehicle to be ridden in the full open/top off configuration, and either with or without doors 104. The retractable cockpit canopy system 102 offers protection from foul weather opening up year-round use and making this attractive to everyone from workday commuters to recreational riders. Commuters can enjoy using the single occupancy HOV lane with the comfort of climate control. Entirely unique to the three-wheeled two-front-one-rear tricycle 100 is an interactive lean control (ILC) system described in greater detail below in FIG. 2-47 that provides stability in situations where conventional vehicles would roll-over.

In some implementations, the three-wheeled two-front-one-rear tricycle 100 employs motorcycle type handlebars, with common motorcycle type controls (clutch, brake and throttle). Switches are mounted on each hand grip for initiating lean control. The right hand switch leans the three-wheeled two-front-one-rear tricycle 100 to the right and the left hand switch leans the three-wheeled two-front-one-rear tricycle 100 to the left. The switches may be a simple on/off type or may be used to initiate a preprogrammed lean profile (speed proportional, soft start, etc.) Alternatively, an additional axis of motion at each hand grip may be employed to initiate lean control, so that lean is initiated by bending the hand grip downward. This control may be a simple on/off type or may be proportional, the angle of the hand grip being proportional to the angle of the commanded lean.

The three-wheeled two-front-one-rear tricycle 100 employs an automobile type steering wheel. Switches are mounted at locations corresponding to the thumb when the driver's hands are placed at the common 10 o'clock and 2 o'clock positions. Alternatively, a trigger type switch may be employed mounted at locations corresponding to the forefinger when the driver's hands are placed at the common 10 o'clock and 2 o'clock positions. Alternatively, an additional axis of motion (yaw) at each hand location may be employed to initiate lean commands. These controls may have any of the characteristics noted in the motorcycle type section. Other implementations of the three-wheeled two-front-one-rear tricycle 100 that have a saddle seat and handlebars fall into the general category of motorcycle. An important distinction of the three-wheeled two-front-one-rear tricycle 100 that have a saddle seat and handlebars is that the three-wheeled two-front-one-rear tricycle 100 can include a saddle because of the interactive lean control (ILC) system.

In some implementations, the three-wheeled two-front-one-rear tricycle 100 employs a two axis joystick for acceleration/deceleration and turning. Two switches are mounted on the joystick for thumb operation. Alternatively, an additional axis of motion (yaw) may be employed to initiate lean commands. These controls may have any of the characteristics noted in the motorcycle type section. While the three-wheeled two-front-one-rear tricycle 100 is not limited to any particular three-wheeled two-front-one-rear tricycle 100 and retractable cockpit canopy system 102 for sake of clarity a simplified three-wheeled two-front-one-rear tricycle 100 and retractable cockpit canopy system 102 are described.

The three-wheeled two-front-one-rear tricycle 100 provides active control in a countersteering leaning trike at performance speeds with human-rated safety system design and an intuitive/purest motorcyclist control.

Apparatus Implementations

In the previous section, a system level overview of the operation of an implementation was described. In this section, the particular apparatus of such an implementation are described by reference to a series of diagrams.

Figure 2:
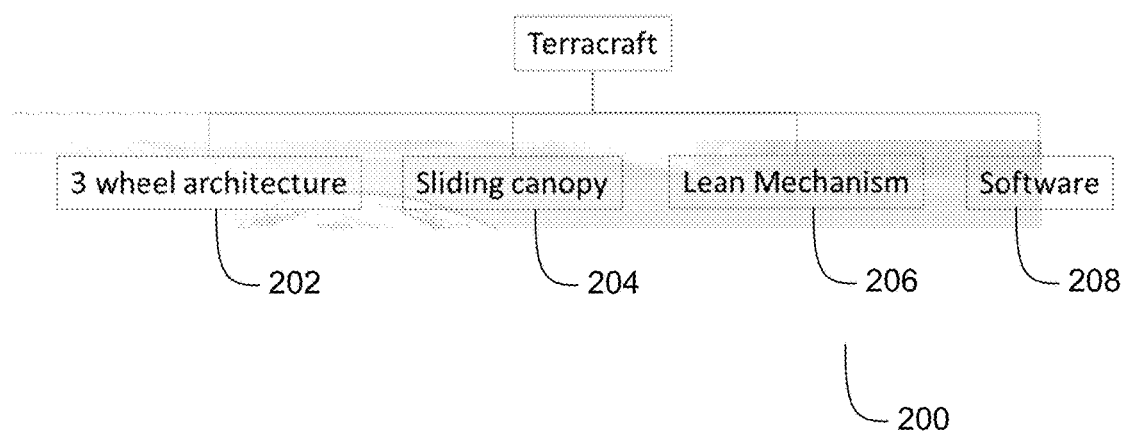
FIG. 2 is a block diagram of a three-wheeled two-front-one-rear vehicle, according to an implementation.

FIG. 2 is a block diagram of a vehicle 200 that is three-wheeled two-front-one-rear, according to an implementation. The vehicle 200 includes the following elements: a three-wheeled architecture 202, a sliding canopy 204, a lean mechanism controller 206, and software 208. For purposes of this description the term a lean mechanism controller 206 refers to all elements mechanical, electrical, electronic (including software). These include the lean mechanism controller 206 as well as other electronically controlled or assisted driving elements such as braking, steering and suspension, electrical distribution systems, batteries, motors, mechanical linkages and gearings, hydraulics and associated pumps and valves, etc., sensors, computers and software.

In order for the lean mechanism controller 206 to control the tilt of the vehicle some means of determining the tilt of the vehicle is required. This may be accomplished through any of the following means.

The Mechanical Position Sensor measures the mechanical motion of the lean actuator. This motion may be linear or rotational depending on the type of actuator used.

With a Linear Lean Actuator the tilt angle of the wheels can be determined by measuring the length of the linear actuator. This may be done by employing linear potentiometers, string potentiometers, or a linear variable differential transformer (LVDT).

With a Rotary Lean Actuator the tilt angle of the wheels may be determined by measuring the rotational angle of the rotary actuator. This may be done by employing rotary potentiometers, resolvers, synchros, optical or electrically commutating encoders, or magnetic angle sensors. This measurement may be taken on the actuator shaft or at the wheel itself.

The tilt angle may be inferred from knowledge of the state of the actuator motor, specifically the number of rotations of the motor from some known position, and the turning ratio of the gearing in the actuator. One or more known positions can be detected with the use of limit switches or mechanical stops. Motor rotation may be measured using any of the rotational position sensors noted above. Alternatively, in the case of stepper motors, the number of rotations of the motor is known from the number of steps commanded by the control computer. Alternatively, in the case of brushless DC (BLDC) motors, the number of rotations of the motor is known from the angular feedback required for any BLDC motor. This feedback is in the form of reverse EMF, Hall effect sensors, or any of the rotary sensors noted above.

The tilt angle may be measured by employing inertial sensors such as gyroscopes and accelerators, in some implementations, based on micro-electro-mechanical systems (MEMS) technologies. In an implementation of this element the tilt angle would be measured by at least two of the above methods, one with high precision for the operation of the lean actuator control loop and others with less resolution as a means of ensuring the accuracy of the control loop sensor.

The TC employs Inertial Measurement Unit (IMU) sensors deployed in at least four locations. These locations include the vicinity of each of the three wheels and at the CG. At each location is a set of at least three identical IMU sensors. Each IMU measures acceleration in three axes, angular rate in three axes, and magnetic field in at least one axis. Each IMU may be one or multiple sensors acting together. The data from the IMUs is used to determine all the forces acting on the vehicle 200 at any moment. This allows for precise calculation of the lateral resultant force needed to calculate the tilt angle. IMU data also allows for the determination of magnetic heading, road incline and smoothness, braking and acceleration forces, aerodynamic forces, skid and hydroplaning and automatic CG calculation (see below). The data from each IMU is compared against the other IMUs in the set and made available to the lean mechanism controller 206 (LMC) software. In the event that the data from all sensors in the set do not match within the manufacturer's tolerance a fault is registered in the LMC software and displayed to the driver, and the faulty sensor is disabled. The sensor sets at the four locations are compared against each other. In the event that the data from all sensor sets do not match within expected characteristic parameters a fault is registered in the LMC software and displayed to the driver, and the faulty sensor set is disabled.

LMC is an umbrella term for the set of distinct and distributed electronics and software control functions that form the vehicle 200 driver interface. These include everything from low level signal processing to environment modeling and adaptive control. For purposes of this description "electronics" includes any electronic device used to manipulate electrical power and sensor signals at the analog level, and any means of communicating between sensors or processing functions. "Software" includes any mathematical of symbolic digital process whether encoded in as machine executable instructions or as reconfigurable digital logic circuits.

The lean mechanism controller 206 operates autonomously at all times to ensure adequate safety margins while the vehicle 200 is moving, but the driving experience is greatly enhanced when the driver has the ability to initiate lean action, especially when entering and exiting a turn. The vehicle 200 employs a variety of manual controls, described as follows.

The vehicle 200 employs sensors in the driver seat to detect when the driver leans to the left or right, as a motorcycle rider would lean to control the tilt of a motorcycle. The seat contains load cells to measure the differential in weight between the left and right side of the seat. Alternatively, the seat may pivot about the roll axis when the driver leans right or left and this pivot action is measured by any of the means noted earlier for measuring rotational movement. The seat control may be a simple on/off type, or may be used to initiate a preprogrammed lean profile (speed proportional, soft start, etc.,) or may be proportional, the angle of the seat being proportional to the angle of the commanded lean.

The vehicle 200 detects the driver leaning left or right directly using a video camera. The control is proportional, the commanded lean angle being proportional to the lean of the driver's body. Alternatively, the driver's body motion may be detected by employing an RGB camera and IR laser depth sensor (Kinect® device). Alternatively, the driver's body motion may be detected by an IMU sensor located on the driver's body, typically in a communications headset. The lean mechanism controller 206 and the software 208 in vehicle 200 provide a bionic electromechanical system that senses and enhances the Humans/Riders intuitive lean movements/motions while comparing with multiple electronic sensing and Kinematic systems for redundant safety, adaptive intelligence and optimized/extreme corning performance. The ILC system coupled with independent steering, hardware and science make the vehicle 200 an extreme exotic SuperTrike that rides like a bike. The ILC is interactive and bionically moves with the driver. The most significant aspects are that the ILC cause leaning that is independent of steering inputs, allowing countersteer. In some implementations, the ILC includes forward looking sensors and video analysis for virtually autonomous ride and lean control. The ILC is an autonomous equilibrium system that simulates the intuitive motorcycle rider's actions.

Figure 3:
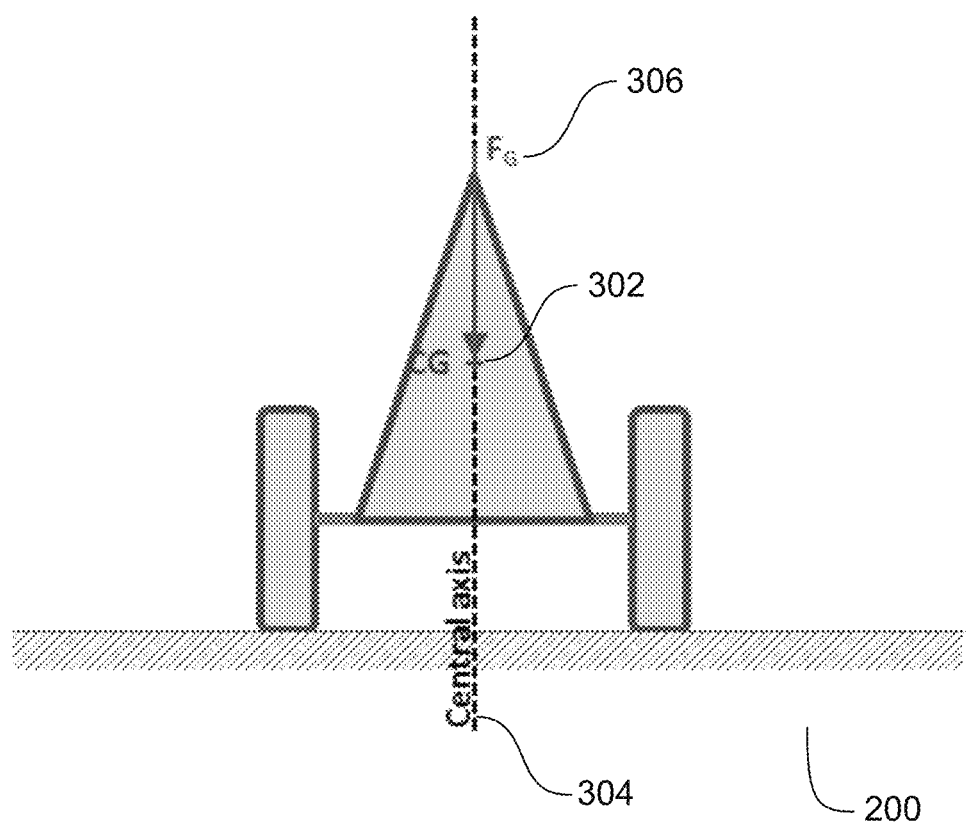
FIG. 3 is a block diagram of forces acting on a three-wheeled two-front-one-rear vehicle, in some implementations in which the forces acting on the center of gravity are in line to that of the central axis of the vehicle.

FIG. 3 is a block diagram of forces acting on a vehicle 200 that is three-wheeled two-front-one-rear, in some implementations in which the forces acting on the CG 302 are in line to that of the central axis 304 of the vehicle 200. In a vehicle 200, maximum stability is achieved when the forces acting on the vehicle center of CG 302, such as the force due to gravity, FG 306 are in line with the central axis 304 of the vehicle 200.

Figure 4:
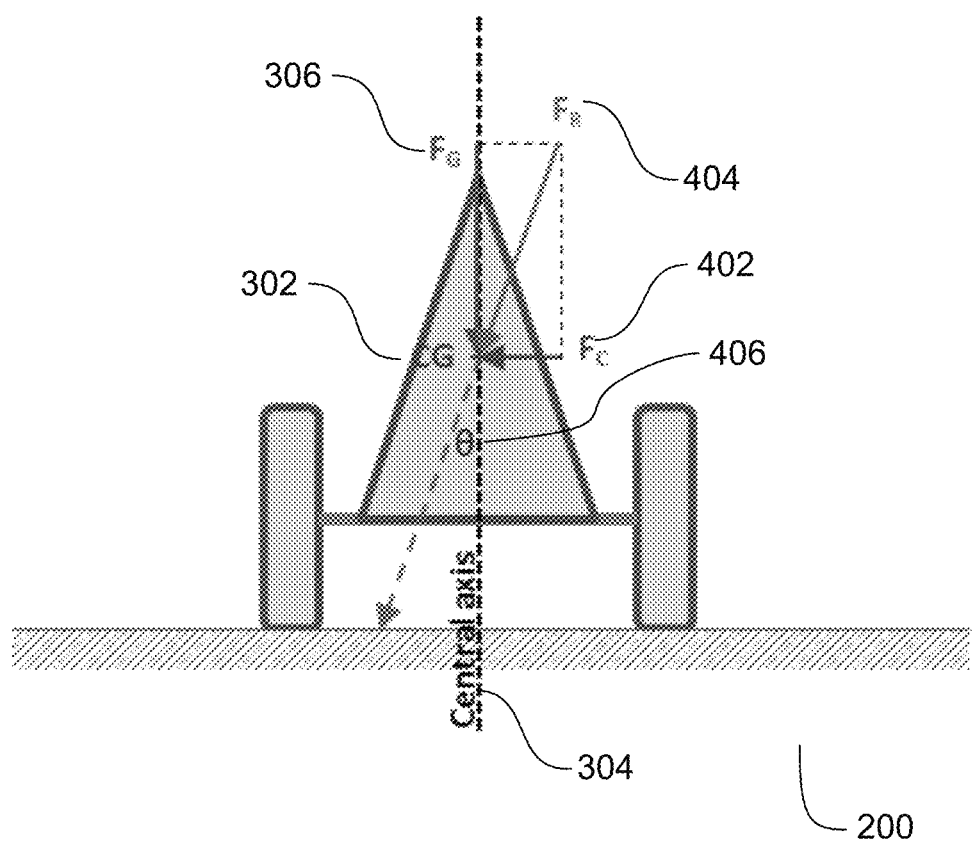
FIG. 4 is a block diagram of forces acting on a three-wheeled two-front-one-rear vehicle, in some implementations in which the vehicle is turning.

FIG. 4 is a block diagram of forces acting on a vehicle 200 that is three-wheeled two-front-one-rear, in some implementations in which the vehicle 200 is turning. Consider a vehicle 200 at rest: The force due to gravity, FG 306, acts on the CG 302 and is in line with the central axis 304 of the vehicle. There are no lateral forces present. Now, consider the case where the vehicle is turning right: In this case, a second force, the FC 402 (centrifugal force), acts laterally on the CG 302. Here the direction of the resultant force, FR 404, is no longer in line with the central axis 304 of the vehicle, deviating by the angle θ406. This causes a counter clockwise torque to develop about the CG 302 which tends to tip the vehicle to the left. (For a left hand turn a clockwise torque will tend to tip the vehicle 200 to the right.)

Figure 5:
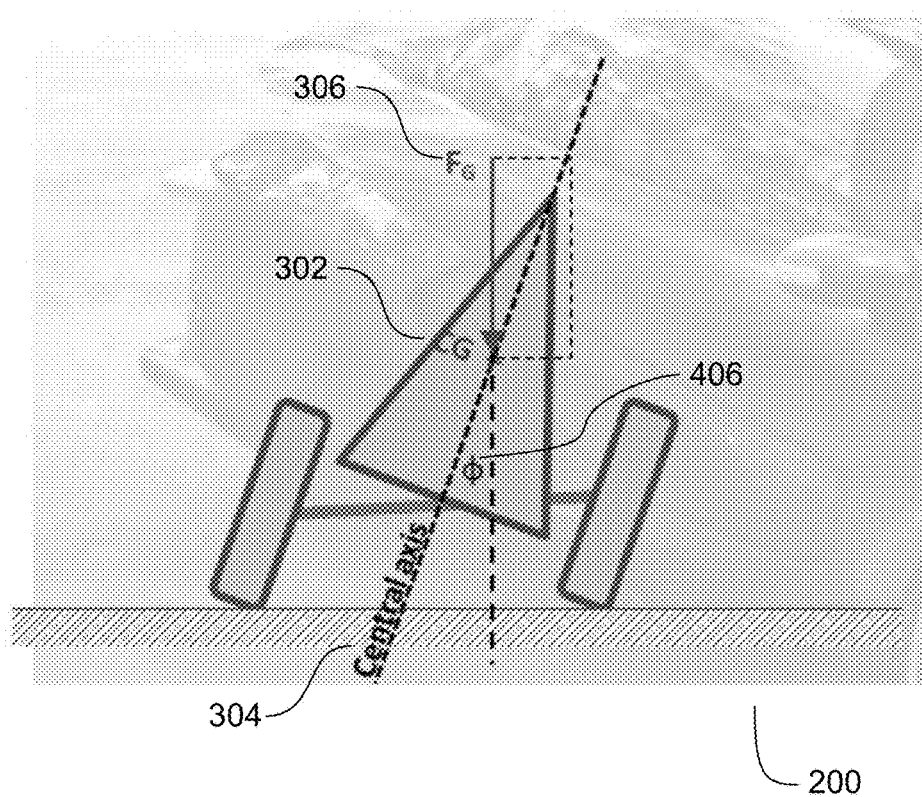
FIG. 5 is a block diagram of forces acting on a three-wheeled two-front-one-rear vehicle, in some implementations in which the vehicle is at rest, but leaning.

FIG. 5 is a block diagram of forces acting on a vehicle 200 that is three-wheeled two-front-one-rear, in some implementations in which the vehicle 200 is at rest, but leaning. Now, consider the vehicle 200 again at rest, but leaning at an angle, ϕ406: Here the CG 302 has moved to the right and the force of gravity, FG 306, is no longer in line with the central axis 304. This causes a clockwise torque to develop about the CG 302 tending to tip the vehicle 200 to the right. (A lean to the left will create a counter clockwise torque that will tend to tip the vehicle to the left.)

Figure 6:
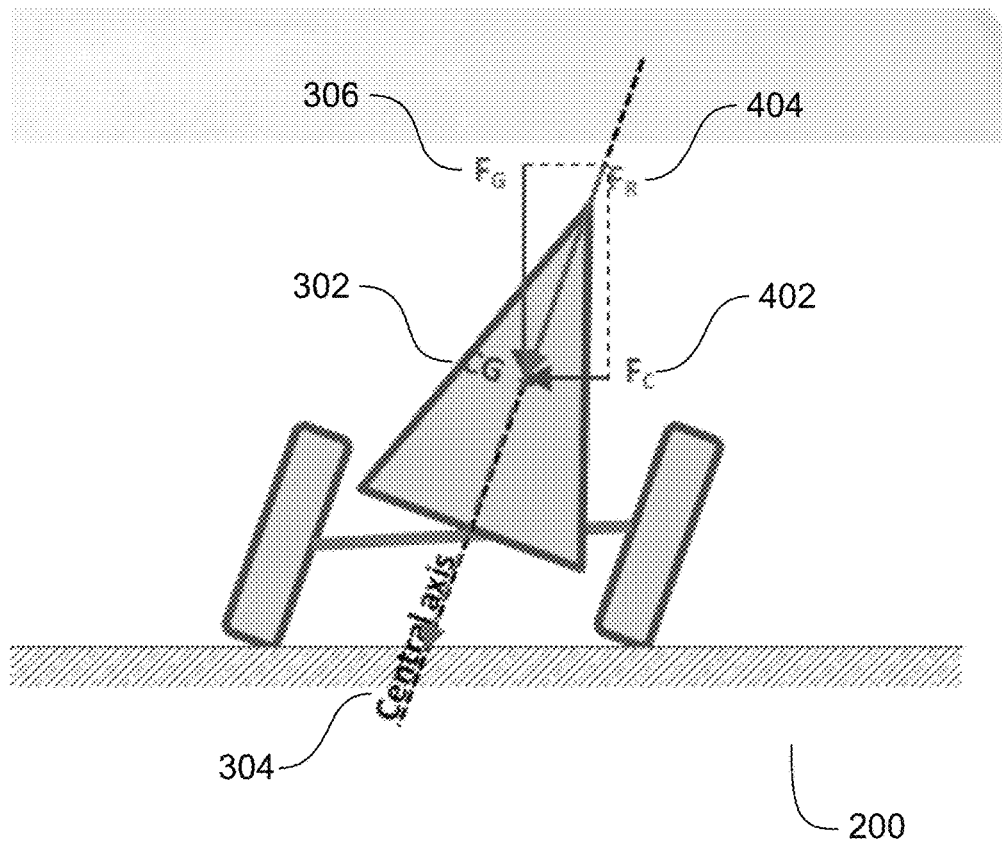
FIG. 6 is a block diagram of forces acting on vehicle that is three-wheeled two-front-one-rear, in some implementations in which the vehicle is turning.

FIG. 6 is a block diagram of forces acting on a vehicle 200 that is three-wheeled two-front-one-rear, in some implementations in which the vehicle 200 is turning. Finally, consider the vehicle 200 making a right hand turn which creates a resultant force, FR 404, acting through the CG 302 at an angle θ (not shown), while the vehicle 200 is tilted at the angle ϕ=θ. It can be shown that the counter clockwise torque produced by the centrifugal force, FC 402, of the turn is exactly canceled by the clockwise torque produced by the lean. The resultant force acting through the CG 302 is once again in line with the central axis 304 of the vehicle 200 and the vehicle 200 is stable.

The function of the Lean mechanism controller 206 is to ensure that the vehicle 200 remains stable by tilting the vehicle in response to lateral forces so that the resultant force acts through the CG in line with the central axis. While developed particularly for turning forces, the lean mechanism controller 206 is also effective in countering the destabilizing effects of wind or unlevel terrain.

The vehicle 200 is tilted by means of a Lean Actuator. The Lean Actuator may be a single actuator connected to both front wheels through a mechanical linkage, or it may be independent actuators mounted to each wheel. Each Lean Actuator may be of two types, either rotary or linear. These are described below.

The Linear Lean Actuator includes a linear actuator connected at one end to the frame of the vehicle 200 and at the other end to one or both front wheels so that the plane of the wheel rotates as the linear actuator extends and retracts. The linear actuator may be electrical or hydraulic.

The Hydraulic Linear Lean Actuator is a system including a single or double acting hydraulic cylinder, pump and valves to control the direction of the cylinder piston. The pump may be driven by an electric motor, or may be driven via a power take off (PTO) either coupled directly to the vehicle 200 engine or by an accessory pulley and fan belt or chain.

The Electric Linear Lean Actuator includes a mechanical linear actuator driven by a motor. The mechanical linear actuator may be of several common types, including Acme screw, ball screw, or roller (planetary) screw. The motor may be electric, of any common type including brushed DC, brushless DC, stepper, AC inductance, reluctance or axial rotor (pancake). Alternatively the actuator may be driven via a PTO as described above in conjunction with a mechanical or magnetic clutch and reversible motion transmission. Alternatively, the actuator may be driven by the rotation of the wheels, through a suitable clutch and reversible motion transmission system. Typically the motor speed will be reduced (and torque correspondingly increased) through a gearing system before driving the linear actuator screw. This gearing may be of any common type, including spur or helical worm gears, planetary gears or strain wave gearing. Alternatively, the Electric Linear Lean Actuator may employ a rack and pinion, driven by a motor of any type described above. The rack may be straight or curved to accommodate the geometry of the mechanical system.

Alternatively, a linear motor may be used where the motor itself becomes the linear actuator. The linear motor may be any common type including induction or synchronous types.

The Rotary Lean Actuator includes a rotary actuator connected at one end to the frame of the vehicle 200 and at the other end to one or both front wheels so that the plane of the wheel rotates as the rotary actuator turns. The rotary actuator may be electrical or hydraulic.

The Hydraulic Rotary Lean Actuator is a system including a rotary hydraulic motor, pump and valves to control the direction of the rotation. The pump may be driven by an electric motor, or may be driven via a power take off (PTO) as described above.

The Electric Rotary Lean Actuator includes a rotating mechanical actuator driven by a motor. The mechanical actuator is a speed reducing gear box of any common type, including spur or helical worm gears, planetary gears or strain wave gearing. The motor may be electric, of any common type including brushed DC, brushless BC, stepper, AC inductance, reluctance or axial rotor (pancake). Alternatively the actuator may be driven via a PTO as described above in conjunction with a mechanical or magnetic clutch and reversible motion transmission. Alternatively, the actuator may be driven by the rotation of the wheels, through a suitable clutch and reversible motion transmission system. The mechanical linkage between the rotary actuator and the wheel(s) may be direct coupling (the wheel mounted on the shaft of the actuator), or through any common type of mechanical linkage, including sprocket and chain.

In addition to tilting the vehicle through the use of the Lean Actuator, an electronic suspension system on the front wheels may be employed, either separately of in conjunction with the Lean Actuator, to provide a tilt by raising the vehicle 200 body at one wheel and lowering it on the other. In particular, the Lean Actuator may be used for the majority of the tilt angle, in response to centrifugal force, while the electronic suspension applied smaller deviations about the tilt angle in response to road or engine vibration.

In addition, independent lean actuators on each front wheel may be employed to apply a camber to the wheels (both wheels leaning outward or inward) during straight ahead driving to provide stability in certain road or weather conditions. This can only be achieved while the vehicle is moving In an implementation of the Lean mechanism controller 206 one or more electric motors are employed to drive the lean actuator. Electrical power for the motor(s) is derived from one or more vehicle storage batteries making use of any of the following electrical distribution topologies. For purposes of the following the term "battery" may refer to a single battery or a parallel or serial combination of batteries, of any rechargeable type, including lead acid or lithium ion batteries. In any case, a battery is not necessarily required if the vehicle is equipped with a high current alternator, or other generator type, however in an implementation of this element the battery supplies the relatively large lean actuator motor currents for the short duration of each turning maneuver and is continuously recharged by the alternator.

Figure 7:
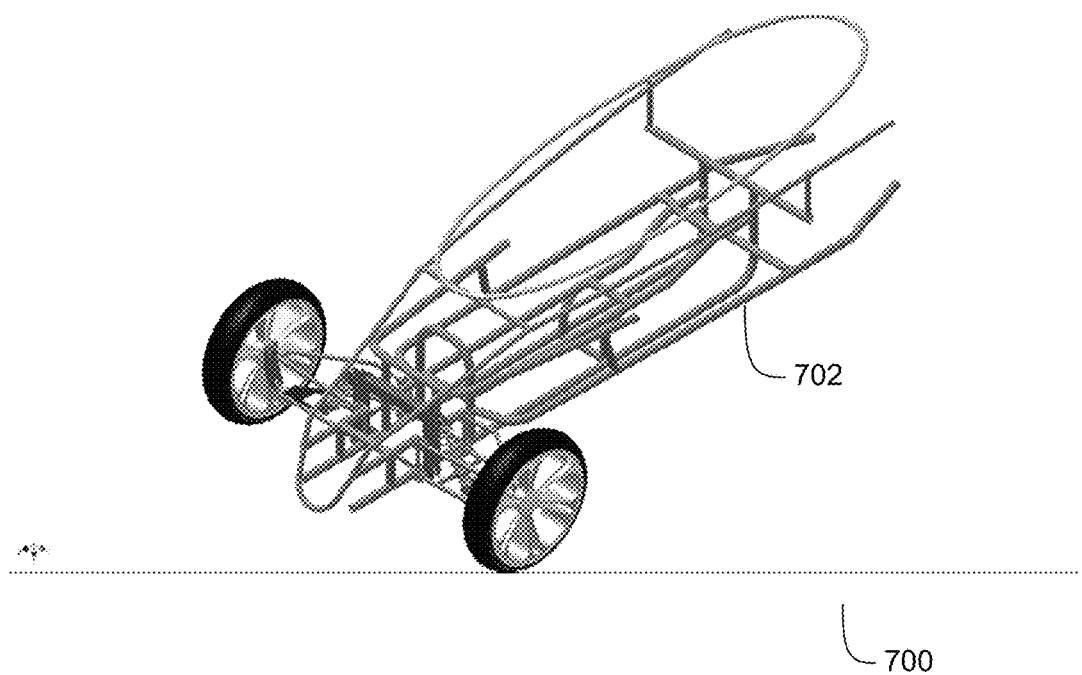
FIG. 7 is an isometric drawing of the front of the tube frame under the body with wheels, according to an implementation.

FIG. 7 is an isometric drawing of the front of the tube frame under the body with wheels 700, according to an implementation. The tube frame 702 under the body provides an added level of safety and protection for increased peace of mind compared to completely exposed riders of two wheeled motorcycles.

Figure 8:
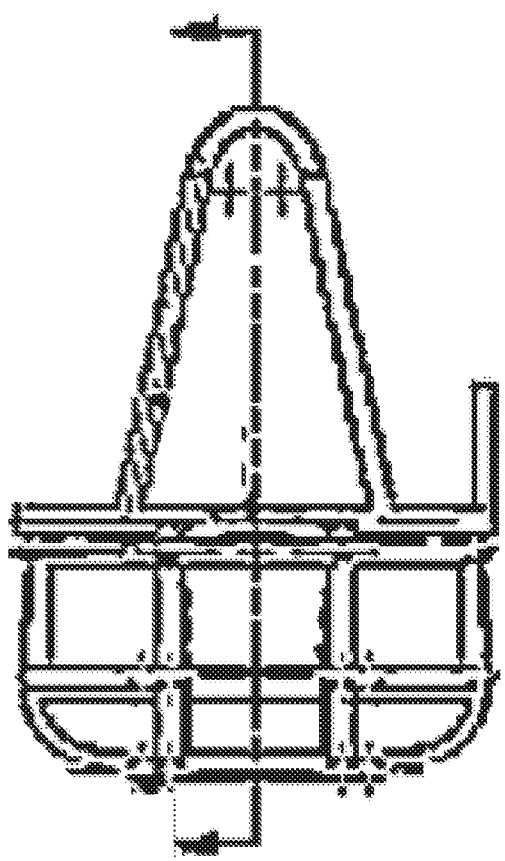
FIG. 8 is a front view of the isometric drawing of the modular chassis with articulating suspension, according to an implementation.

FIG. 8 is a front view of the isometric drawing of the modular chassis, according to an implementation.

Figure 9:
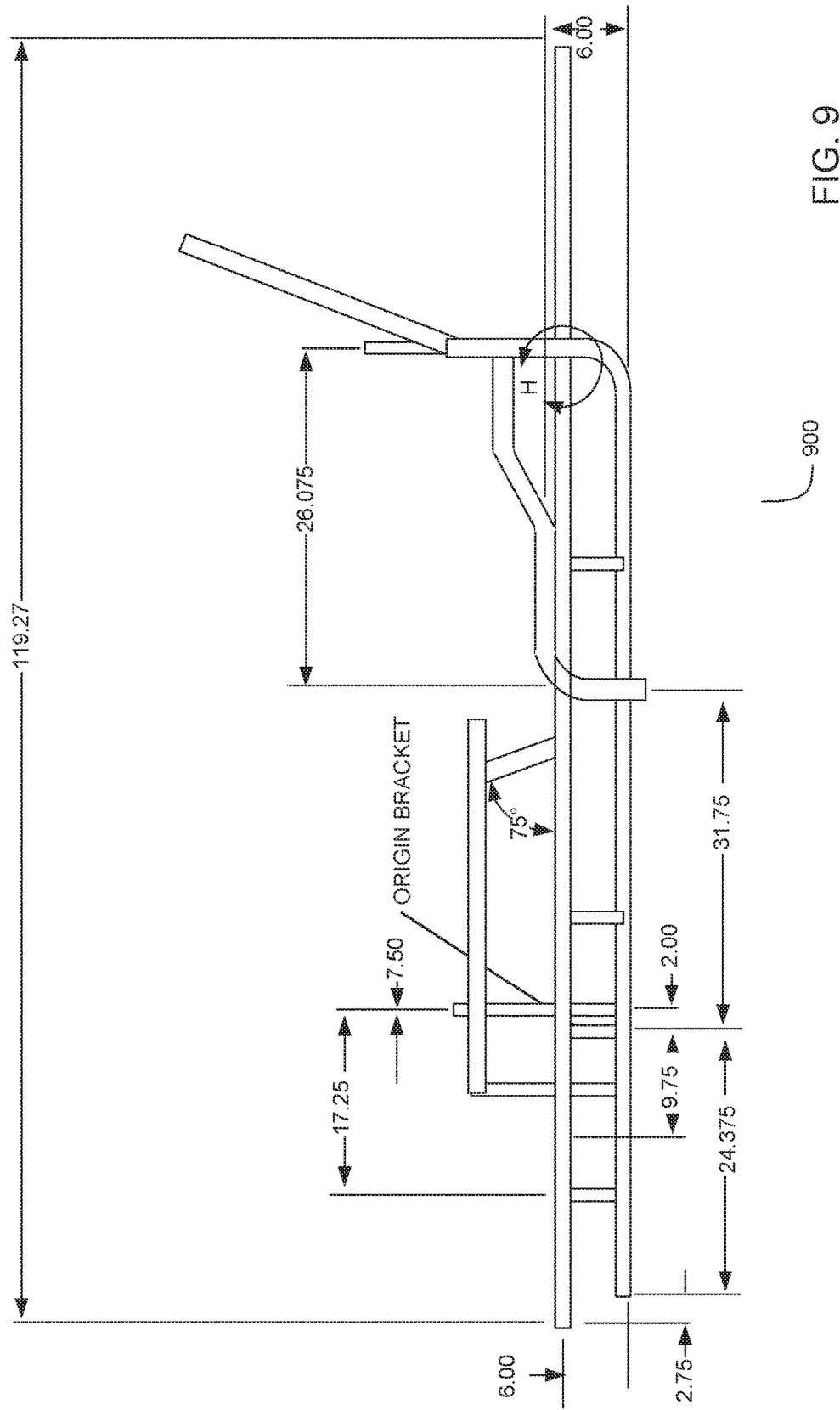
FIG. 9 is a block diagram of the modular chassis with articulating suspension, according to an implementation.
Figure 10:
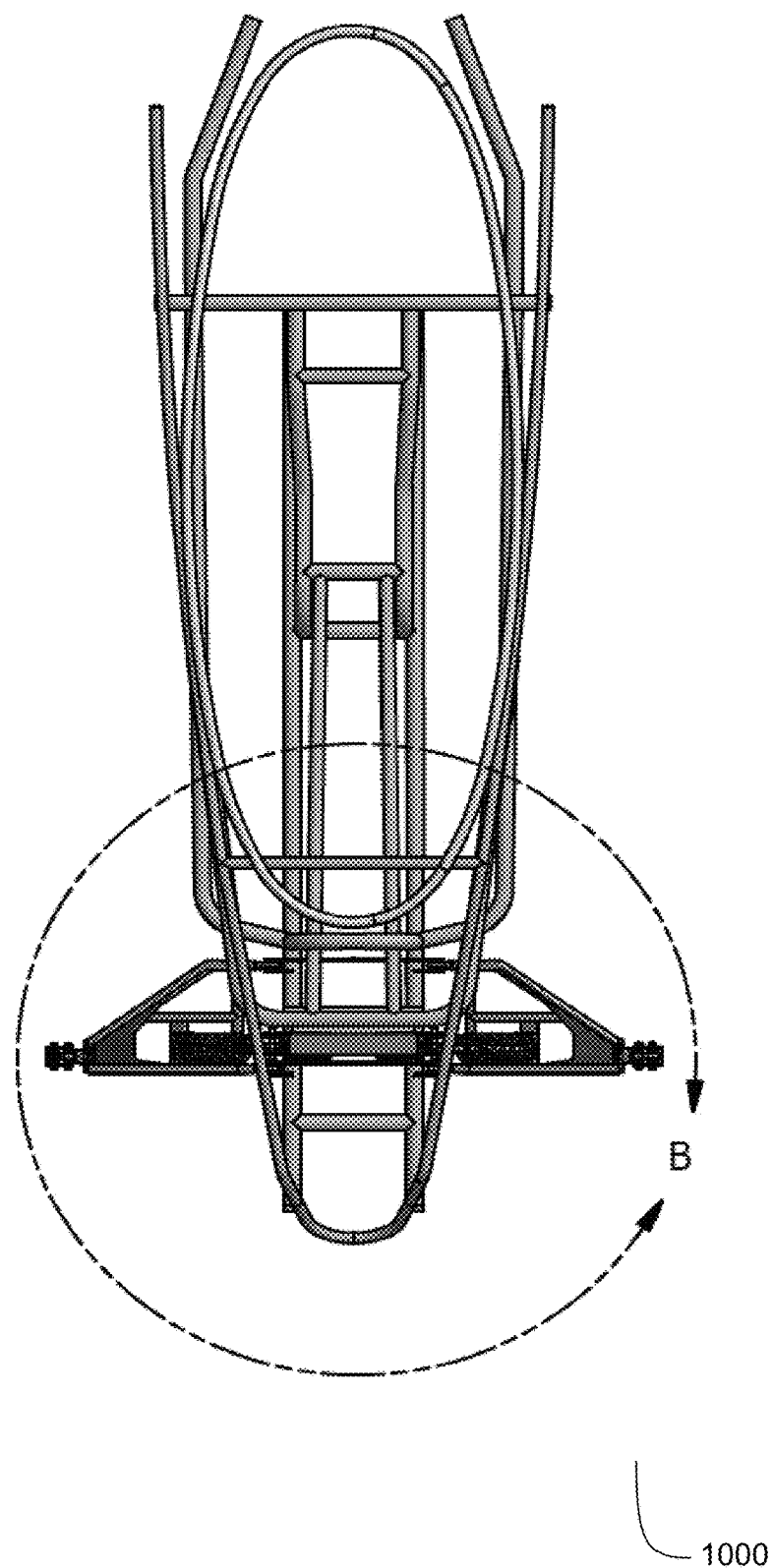
FIG. 10 is a top view of the isometric drawing of the modular chassis with articulating suspension, according to an implementation.

FIG. 9 is a block diagram of the modular chassis with articulating suspension, according to an implementation. The modular chassis is capable of mating up to other OEM motorcycles as a kit conversion and/or a rear chassis extension enabling various drive train configurations in single or double rear wheel drivetrains with numerous power options from electric, alternative fuel, and combustible engines. The modular chassis may be tubular, moncoque, or space-frame FIG. 10 is a top view of the isometric drawing of the modular chassis with articulating suspension, according to an implementation. The modular chassis may be tubular, moncoque, or space-frame.

Figure 11:
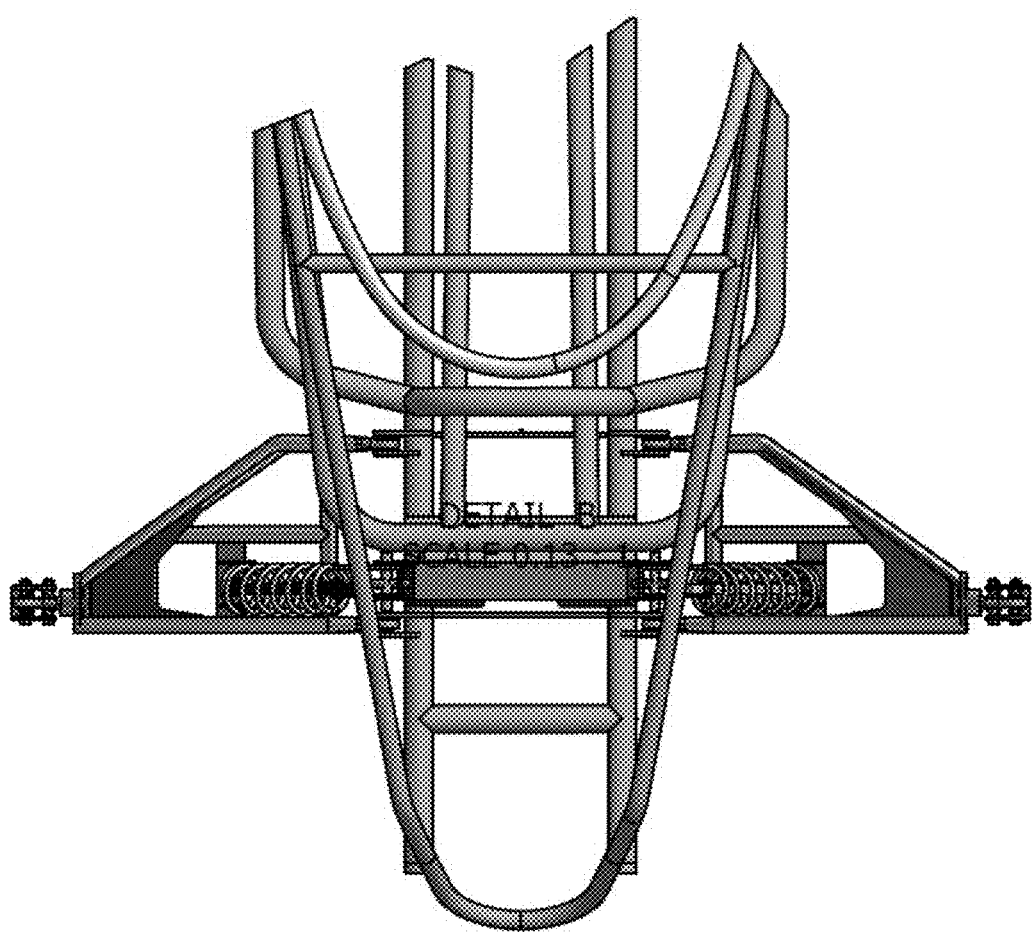
FIG. 11 is an inset of the front axle of FIG. 10, according to an implementation.
Figure 12:
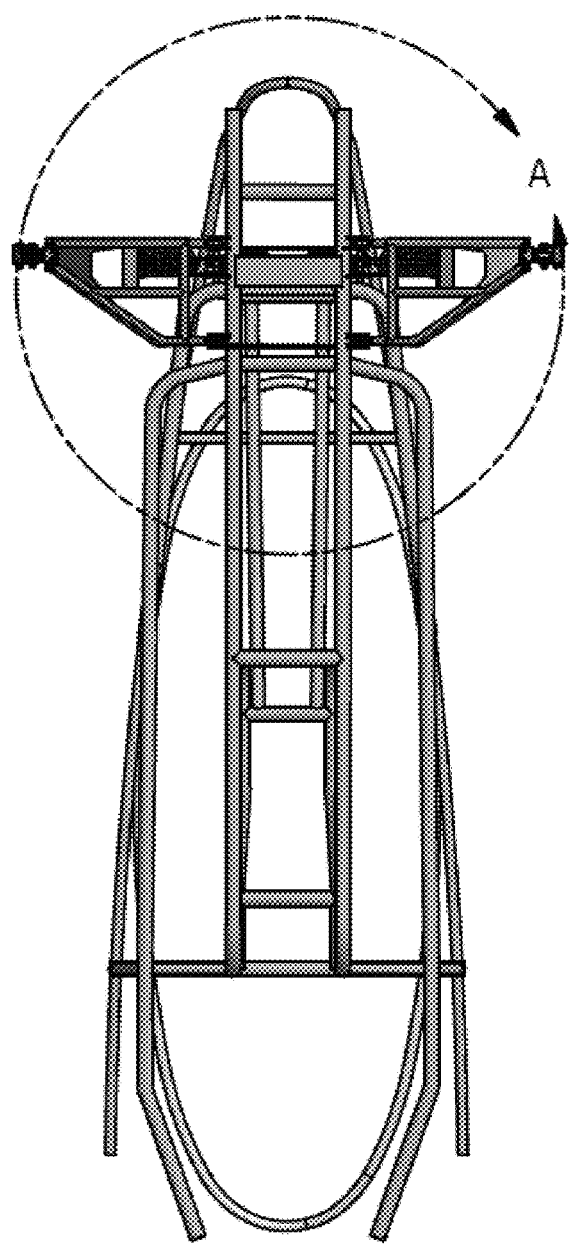
FIG. 12 is a bottom view of the isometric drawing of the modular chassis with articulating suspension, according to an implementation.

FIG. 11 is an inset of the front axle of FIG. 12, according to an implementation. The modular chassis may be tubular, moncoque, or space-frame.

FIG. 12 is a bottom view of the isometric drawing of the modular chassis with articulating suspension, according to an implementation. The modular chassis may be tubular, moncoque, or space-frame.

Figure 13:
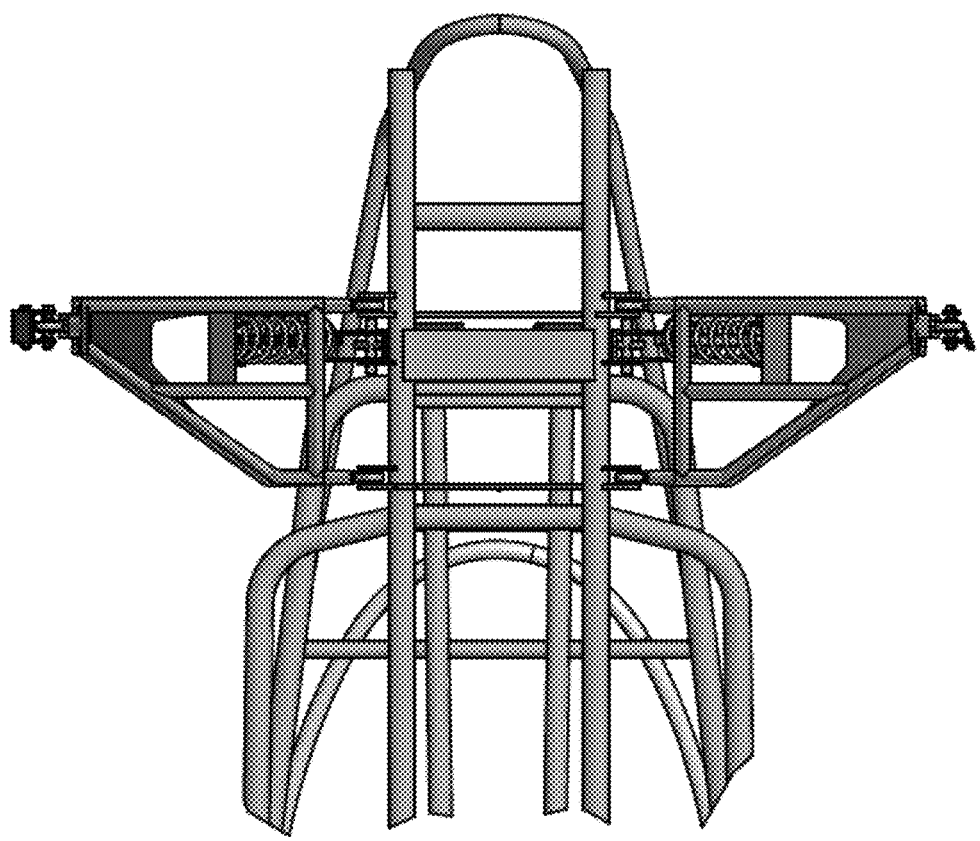
FIG. 13 is an inset of the front axle of FIG. 12, according to an implementation.
Figure 14:
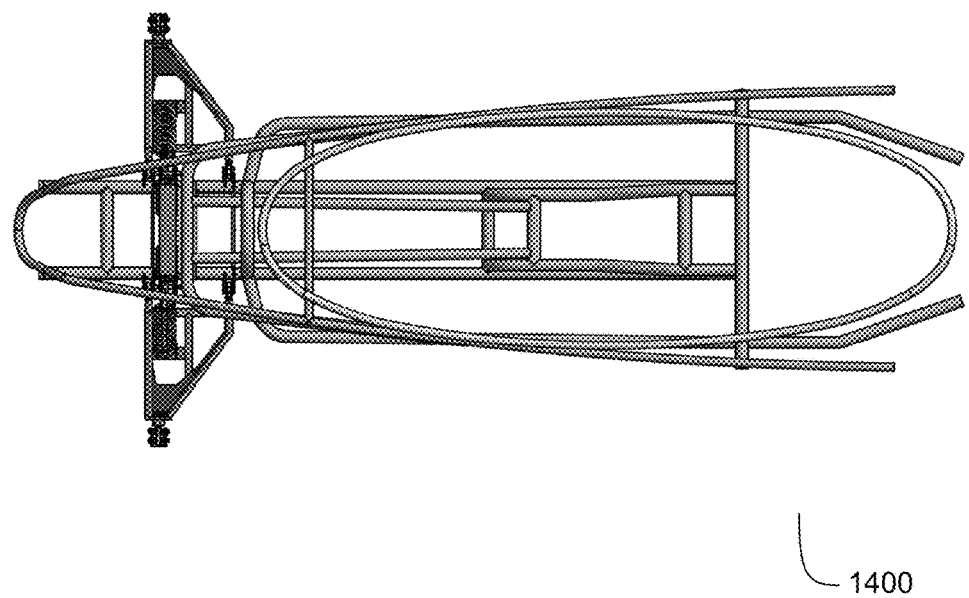
FIG. 14 is a horizontal top view of the isometric drawing of modular chassis with articulating suspension, according to an implementation.

FIG. 13 is an inset of the front axle of FIG. 14, according to an implementation. The modular chassis may be tubular, moncoque, or space-frame.

FIG. 14 is a horizontal top view of the isometric drawing of modular chassis with articulating suspension, according to an implementation. The modular chassis may be tubular, moncoque, or space-frame.

Figure 15:
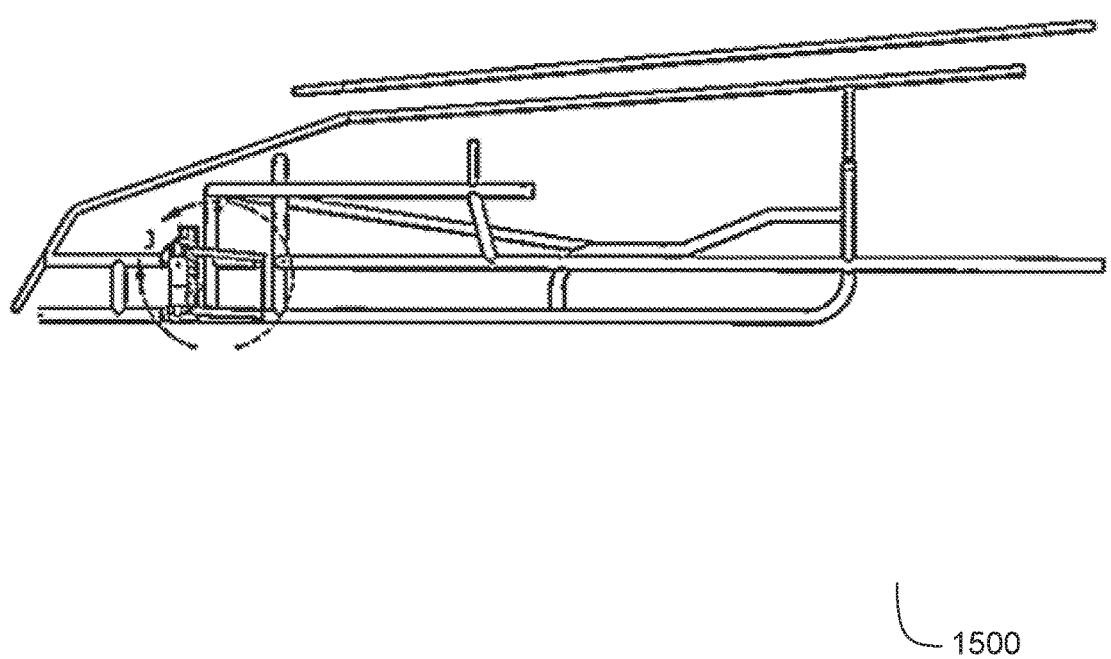
FIG. 15 is a side view of the isometric drawing of the modular chassis with articulating suspension, according to an implementation.

FIG. 15 is a side view of the isometric drawing of the modular chassis with articulating suspension, according to an implementation. The modular chassis may be tubular, moncoque, or space-frame. The suspension set may also be traditional fixed independent suspension.

Figure 16:
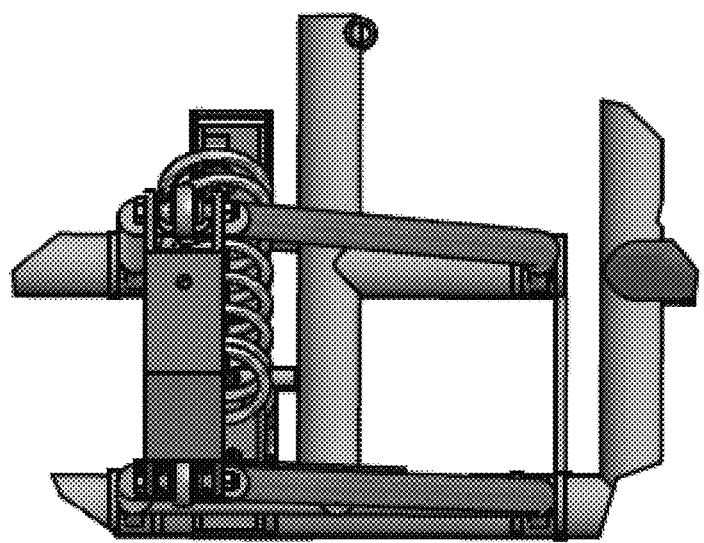
FIG. 16 is an inset of the front axle of FIG. 17, according to an implementation.
Figure 17:
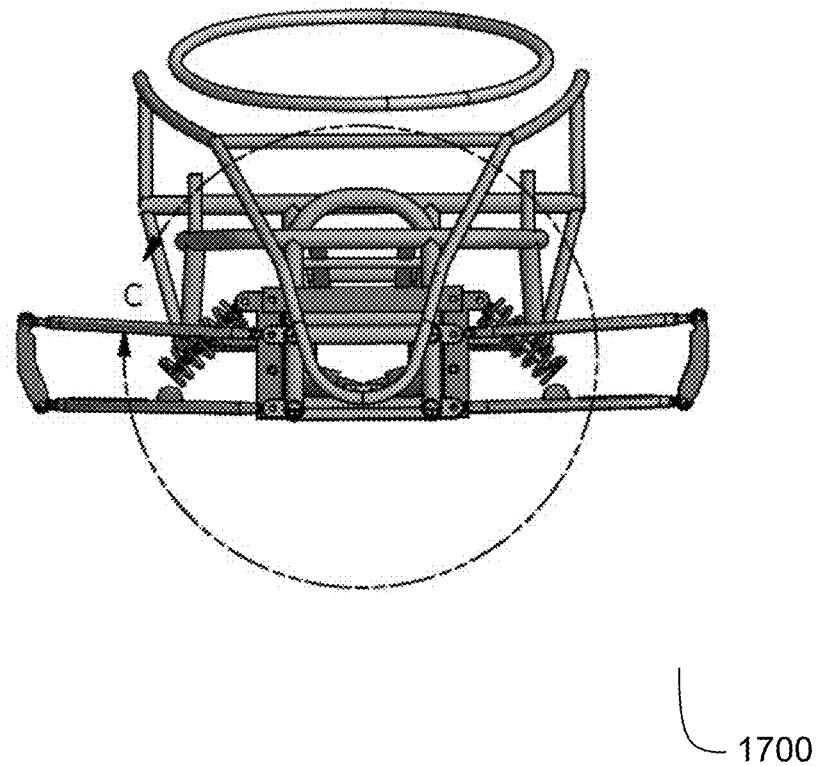
FIG. 17 is a front view of the isometric drawing of the modular chassis with articulating suspension set, according to an implementation.

FIG. 16 is an inset of the front axle of FIG. 17, according to an implementation. The suspension includes an axle spindle, a spring, an upper A-Arm, a lower A-Arm. Both the Upper and Lower A-Arms may be H-Arms, strut, trailing and or leading arm type suspension configuration.

FIG. 17 is a front view of the isometric drawing of the modular chassis with articulating suspension set, according to an implementation. The suspension set may also be traditional fixed independent suspension.

Figure 18:
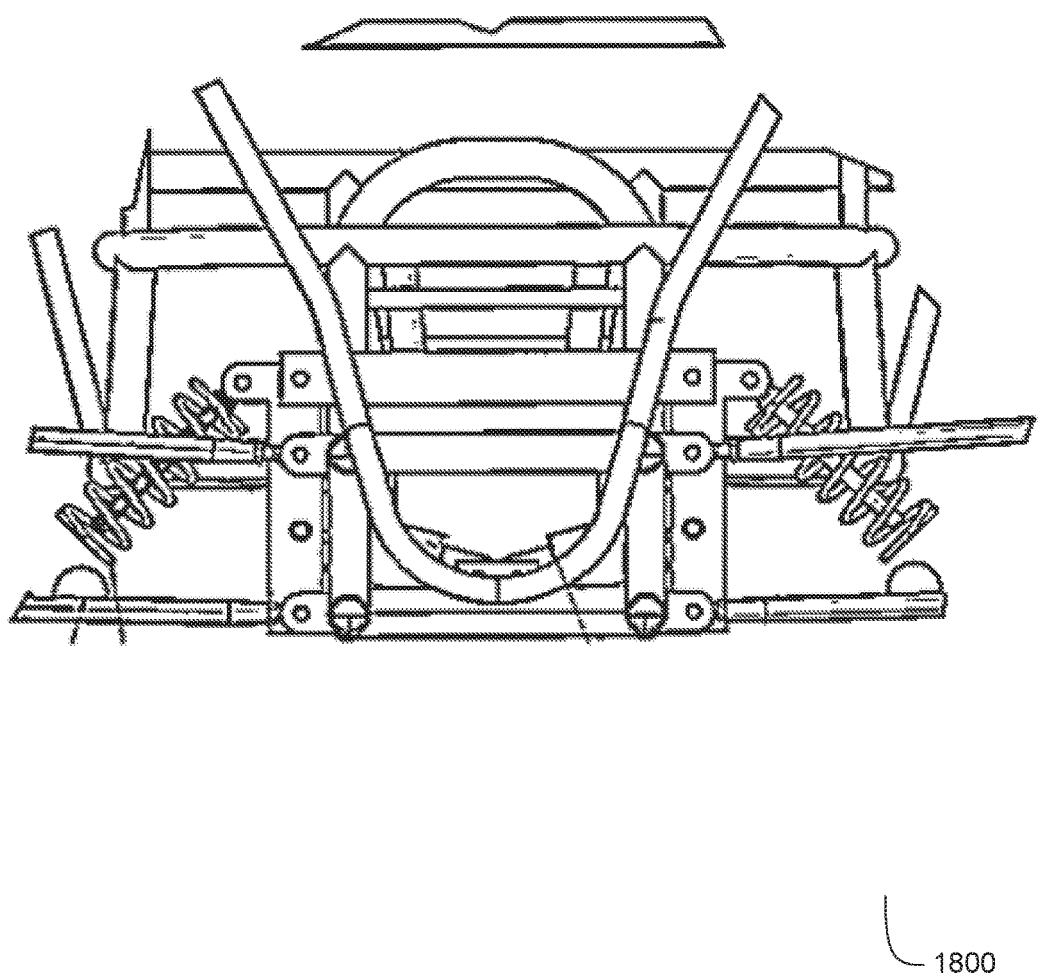
FIG. 18 is an inset of the front axle of FIG. 17, according to an implementation.

FIG. 18 is an inset of the front axle of FIG. 17, according to an implementation. This suspension system may be fixed like conventional automobile or articulate to provide lean-in turns, counter-balancing, and lateral G-forces. This system may be incorporated into the front, rear, or both front and rear of a motorcycle and autocycle.

Figure 19:
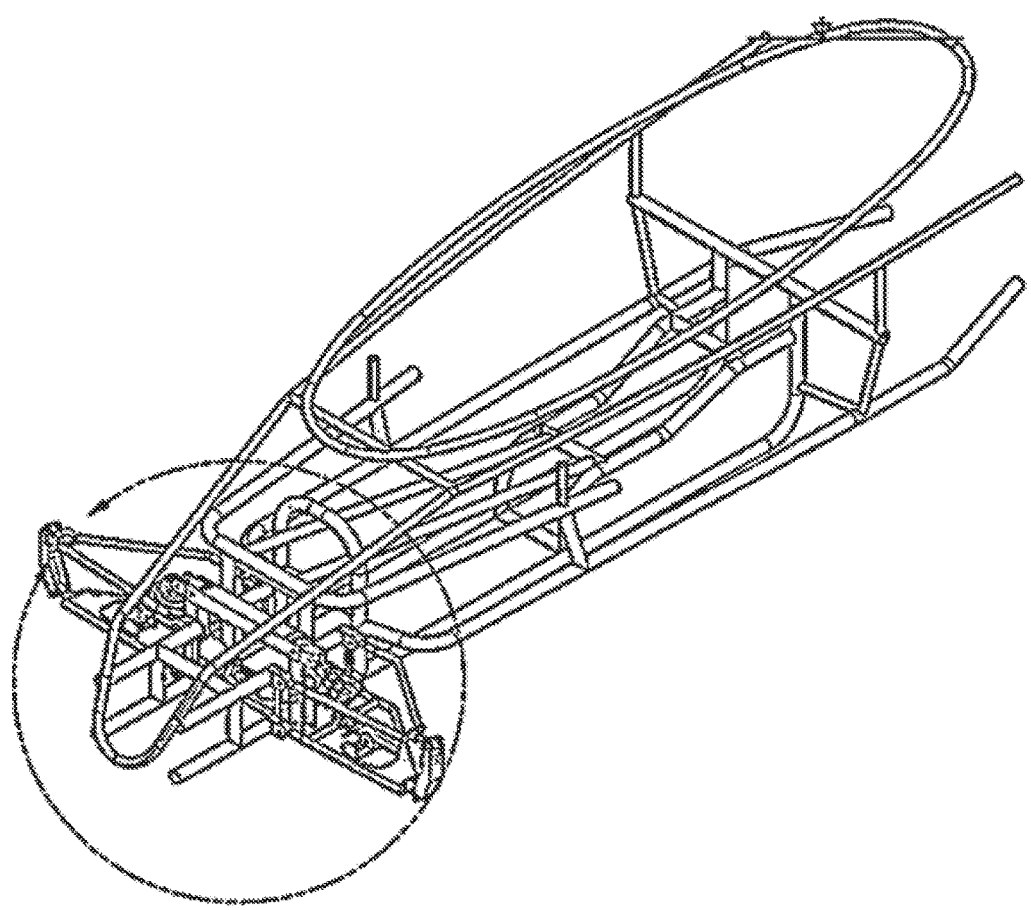
FIG. 19 is an isometric drawing of the tube frame under the body, according to an implementation.

FIG. 19 is an isometric drawing of the tube frame under the body, according to an implementation.

Figure 20:
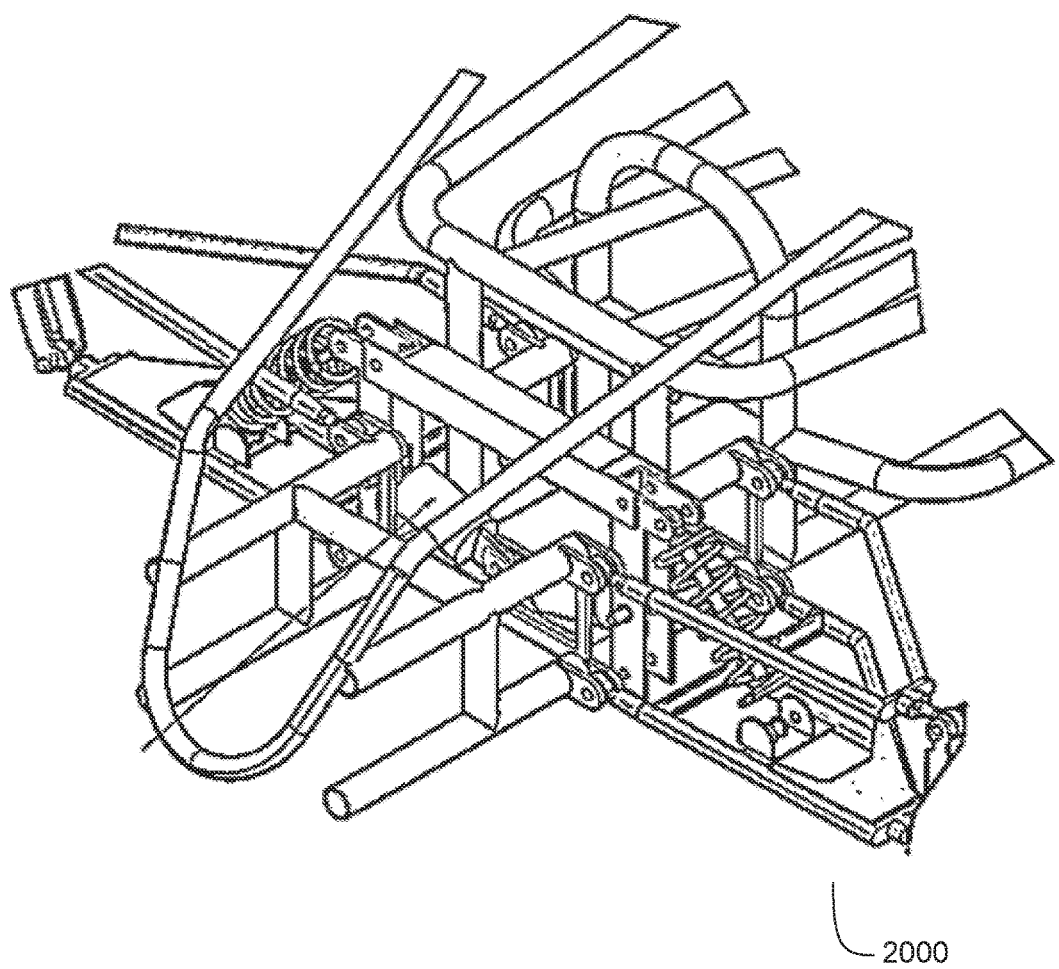
FIG. 20 is an inset of the front axle of FIG. 19, according to an implementation.

FIG. 20 is an inset of the front axle of FIG. 19, according to an implementation.

Figure 21:
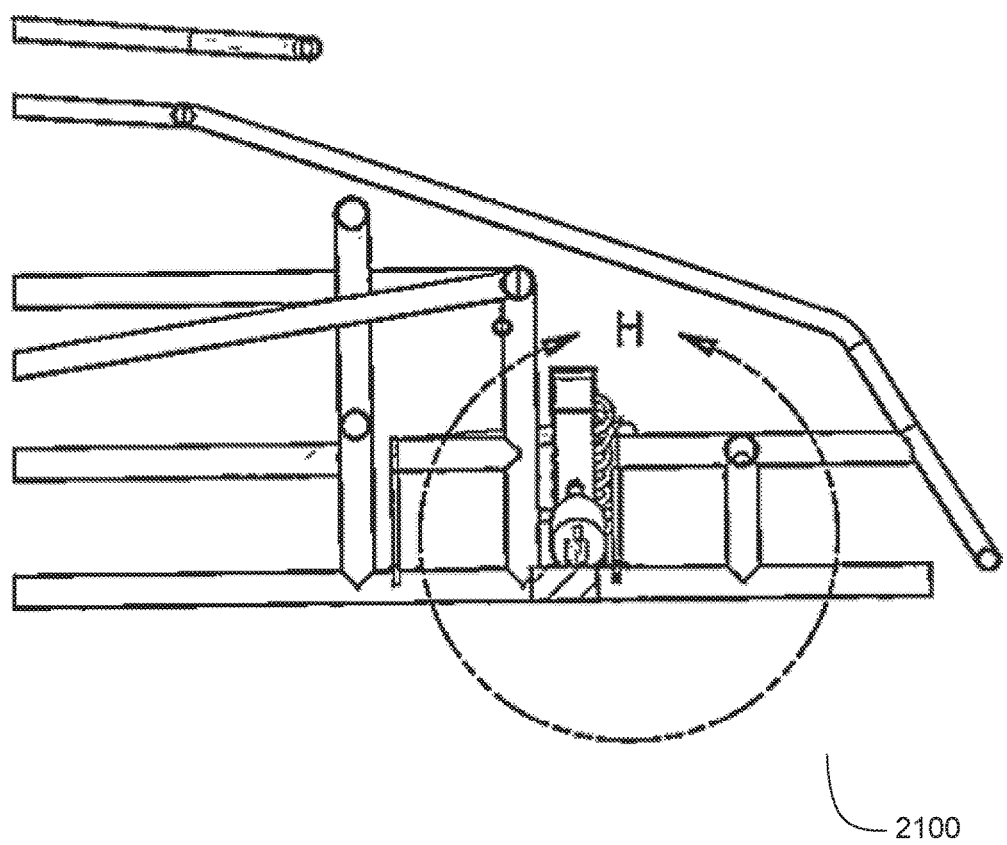
FIG. 21 is a side view of the front portion of the isometric drawing of the tube from under the body, according to an implementation.

FIG. 21 is a side view of the front portion of the isometric drawing of the tube from under the body, according to an implementation.

Figure 22:
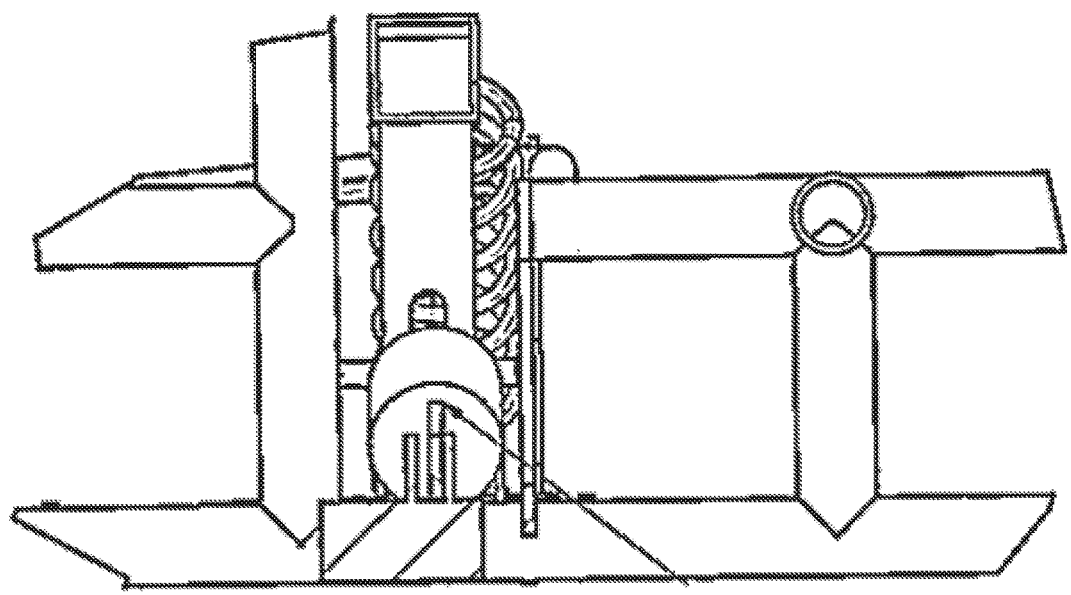
FIG. 22 is an inset of the axle in FIG. 21, according to an implementation.

FIG. 22 is an inset of the axle in FIG. 21, according to an implementation.

Figure 23:
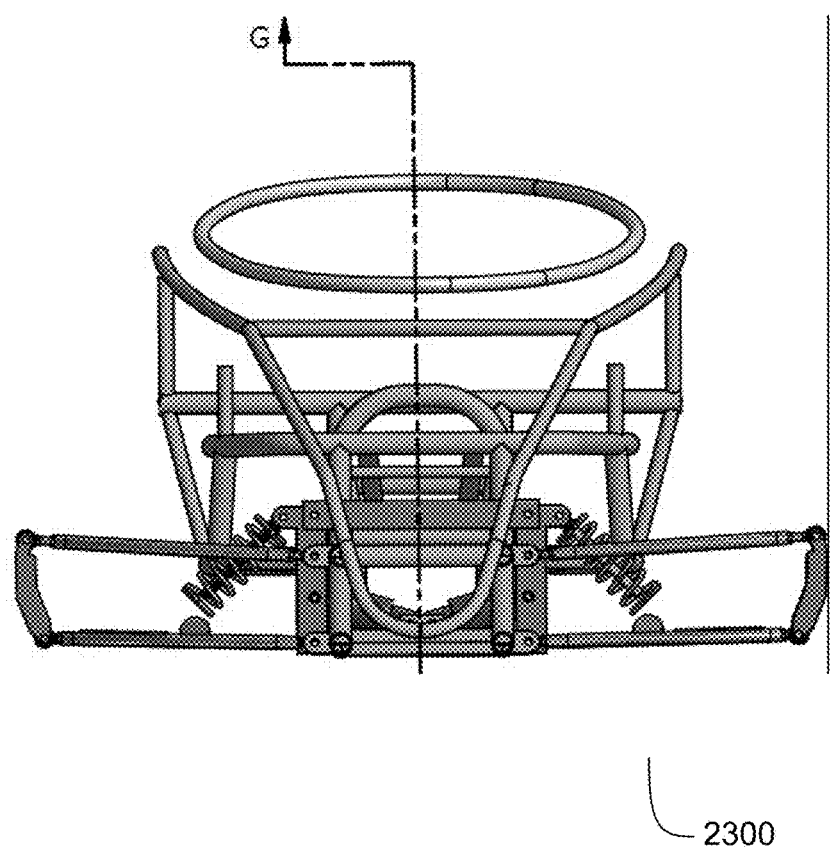
FIG. 23 is a front view of the isometric drawing of the tube frame under the body, according to an implementation.

FIG. 23 is a front view of the isometric drawing of the tube frame under the body, according to an implementation.

Figure 24:
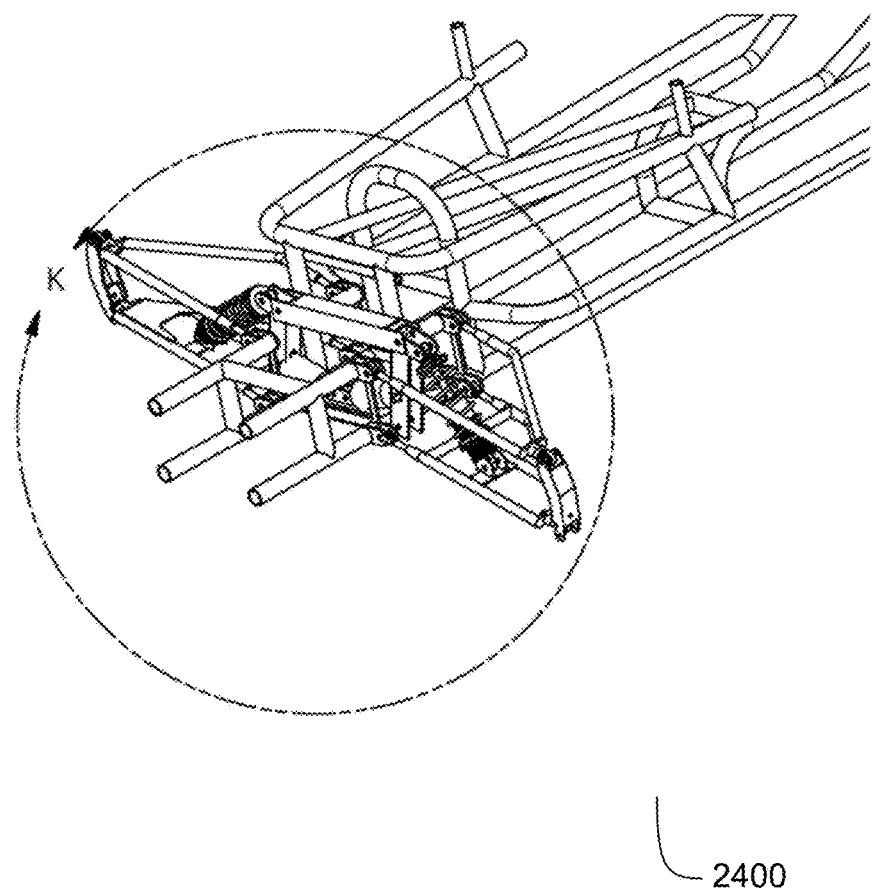
FIG. 24 is a detailed isometric drawing of the front axle and front portion of the tube frame, according to an implementation.

FIG. 24 is a detailed isometric drawing of the front axle with tilting independent suspension system on a modular chassis, according to an implementation. This system is typical of reverse trike 2F1R or quad 2F2R configurations. The suspension system shown is leaning to the right.

Figure 25:
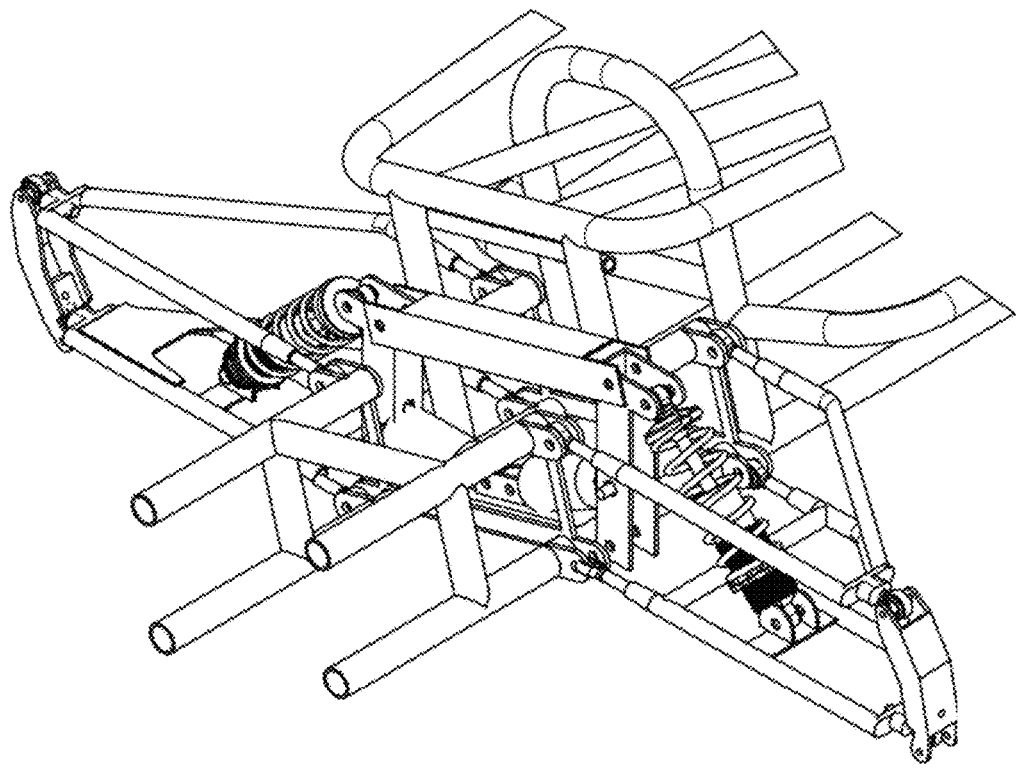
FIG. 25 is an inset of the front axle of FIG. 24, according to an implementation.

FIG. 25 is an inset of the front axle of FIG. 24, according to an implementation. The front axle with tilting independent suspension includes an actuator, lower tower frame mount, a pivot point for the lower tower frame mounter, a pivoting shock tower, and a tower link. The shock tower serves as the shock mount linking the high misalignment long travel A-Arm independent suspension assembly. The shock tower pivots from the lower frame mount. The optional tower link may connect the pivoting shock towers to provide tandem articulation of both left and right independent suspension. One actuator may be linked to the tower link or either tower to control the entire suspension actuation. Alternatively, this member is removed when two actuators are used for independent lean control.

Figure 26:
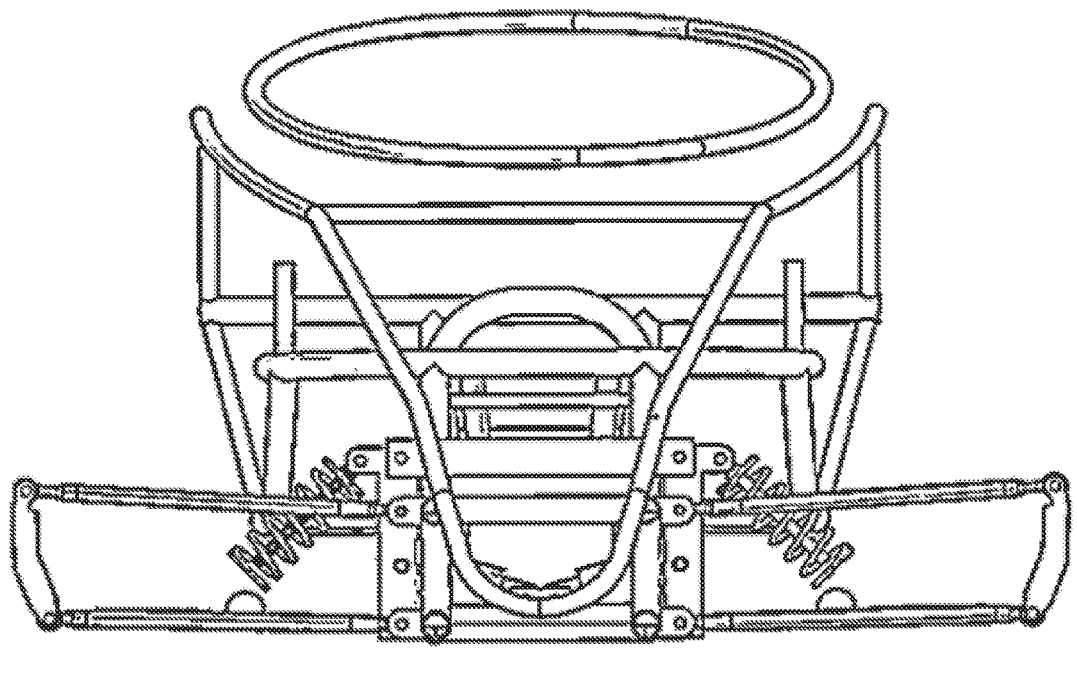
FIG. 26 is a front view of the isometric drawing of the front axle of the tube from under the body, according to an implementation.

FIG. 26 is a front view of the isometric drawing of the front axle of the tube from under the body, according to an implementation.

In regards to FIG. 27-32, an independent secondary fail-safe tilt brake and dampening system is shown. The independent secondary fail-safe tilt brake and dampening system may be a solenoid and gear power off system as illustrated in FIG. 27-32. Alternatively the independent secondary fail-safe tilt brake and dampening system may be a linear friction, electromagnetic, caliper or rotary brake and dampening system. The independent secondary fail-safe tilt brake and dampening system may serve both as an independent secondary safety system and a parallel dampening system that additionally manages and mitigates impact and fatigue of primary control system hardware.

Figure 27:
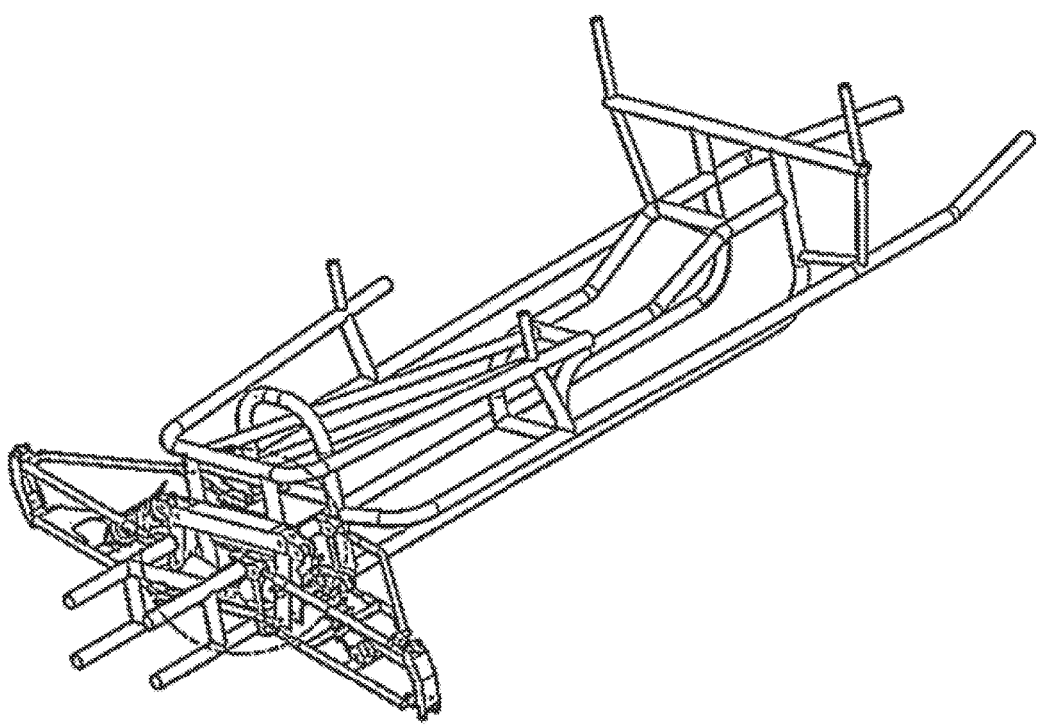
FIG. 27 is an isometric drawing of the modular chassis with articulating suspension and fail-safe apparatus, according to an implementation.

FIG. 27 is an isometric drawing of the modular chassis with articulating suspension and fail-safe apparatus, according to an implementation.

Figure 28:
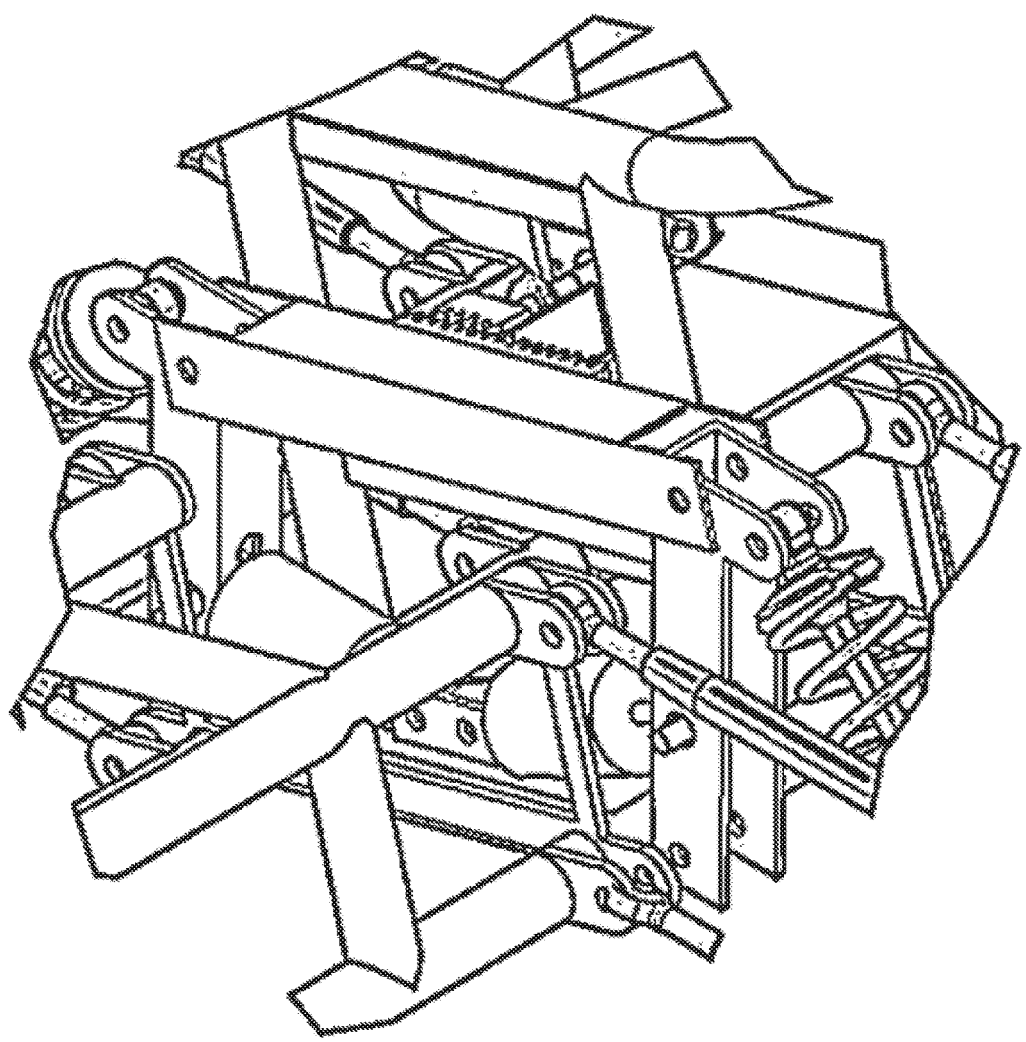
FIG. 28 is an inset of the front axle of FIG. 27, according to an implementation.

FIG. 28 is an inset of the front axle of FIG. 27, according to an implementation.

Figure 29:
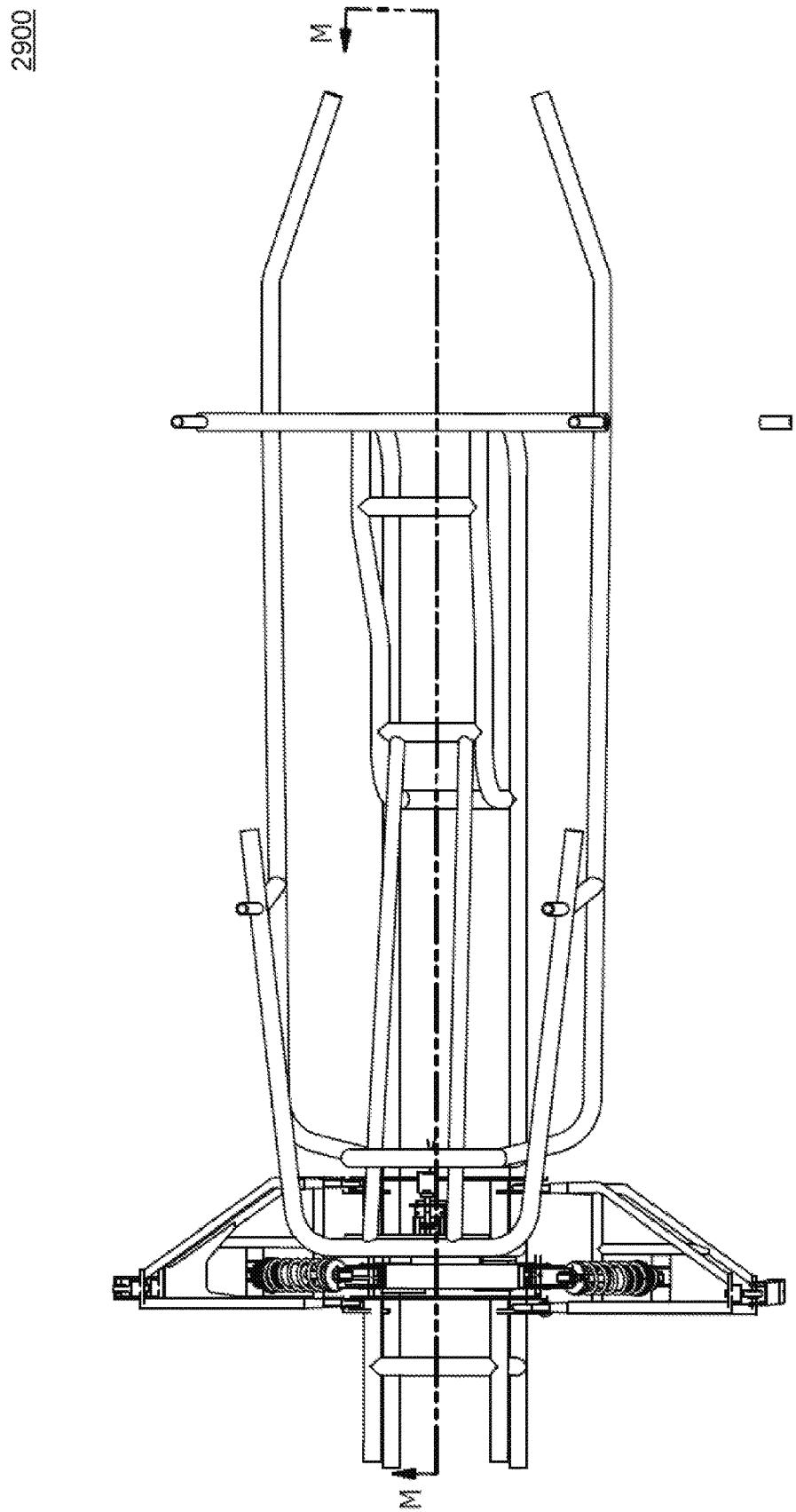
FIG. 29 is a top view of the isometric drawing of the modular chassis with articulating suspension and fail-safe apparatus, according to an implementation.

FIG. 29 is a top view of the isometric drawing of the modular chassis with articulating suspension and fail-safe apparatus, according to an implementation.

Figure 30:
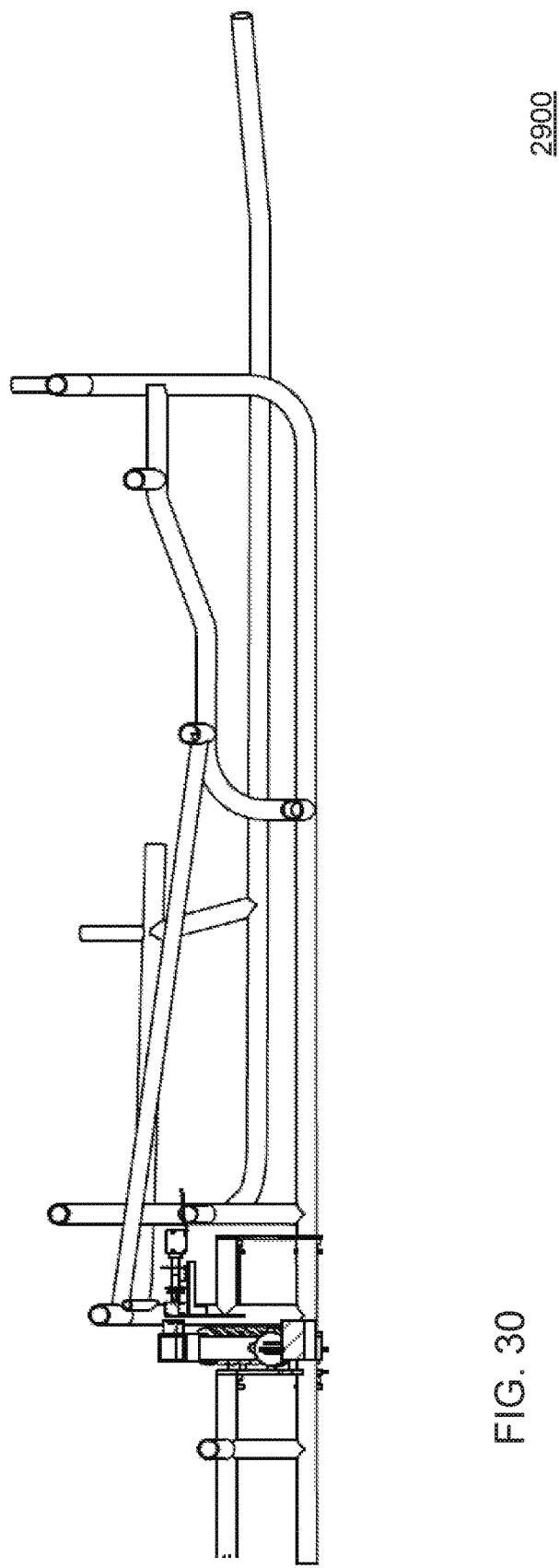
FIG. 30 is a side view of the isometric drawing of the modular chassis with articulating suspension and fail-safe apparatus, according to an implementation.

FIG. 30 is a side view of the isometric drawing of the modular chassis with articulating suspension and fail-safe apparatus, according to an implementation.

Figure 31:
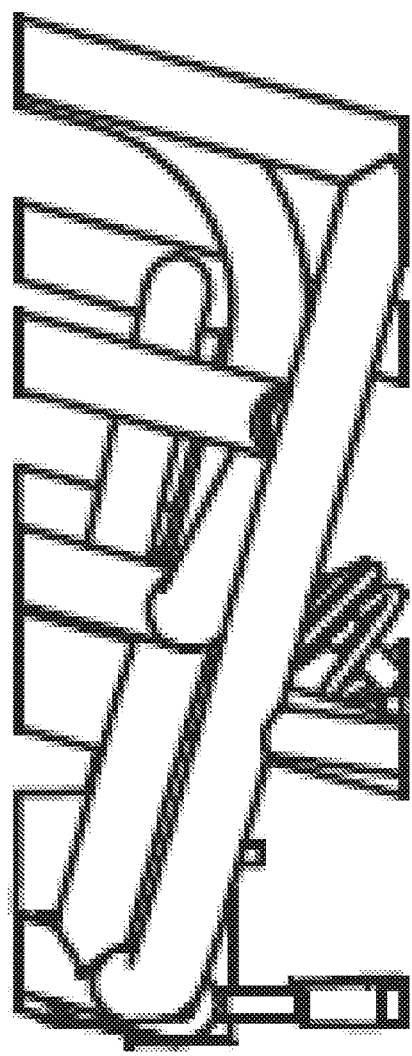
FIG. 31 is an apparatus of the modular chassis with articulating suspension and fail-safe apparatus, according to an implementation.

FIG. 31 is an apparatus of the modular chassis with articulating suspension and fail-safe apparatus, according to an implementation.

Figure 32:
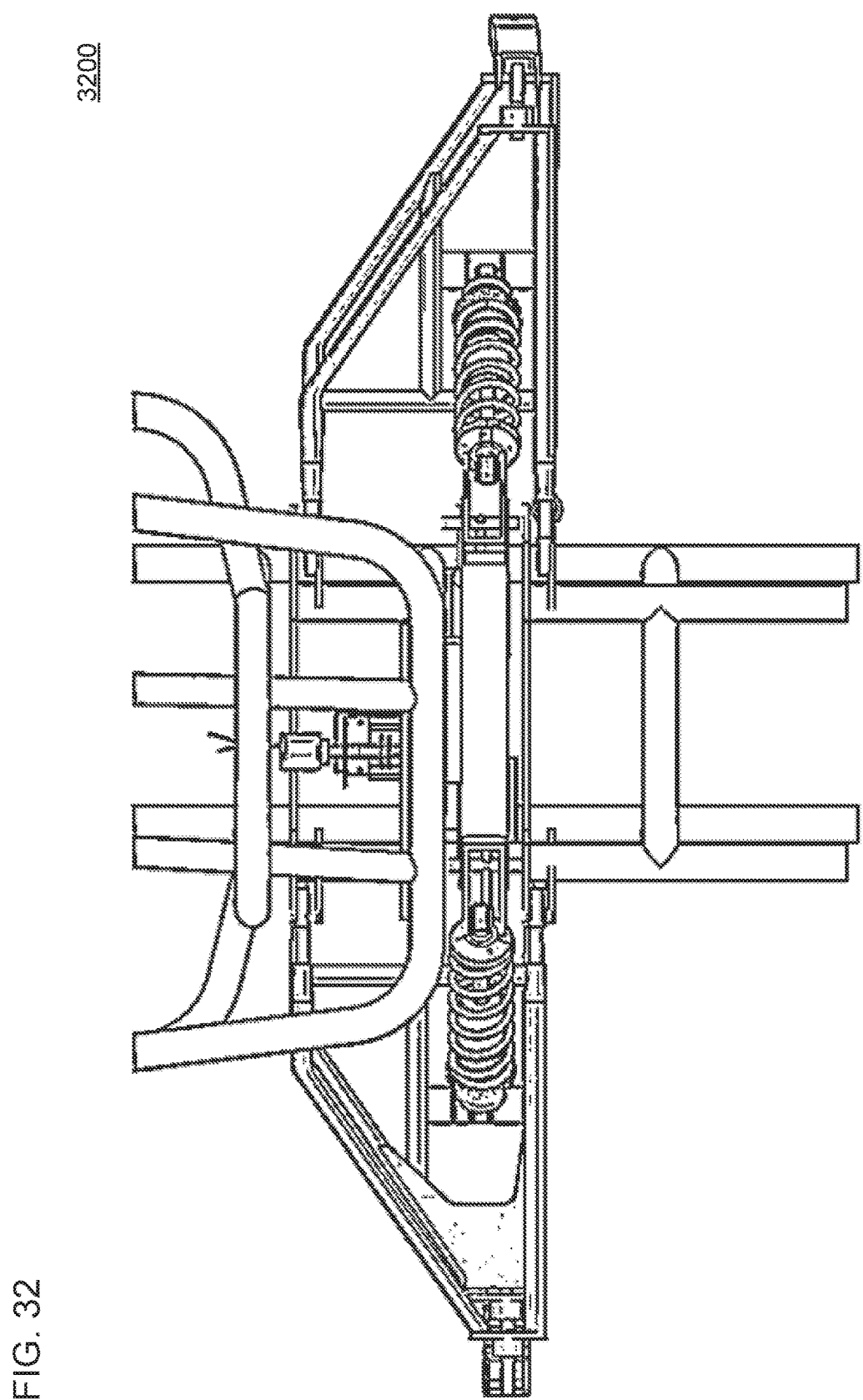
FIG. 32 is a top view of the modular chassis with articulating suspension and fail-safe apparatus, according to an implementation.

FIG. 32 is a top view of the modular chassis with articulating suspension and fail-safe apparatus, according to an implementation.

Figure 33:
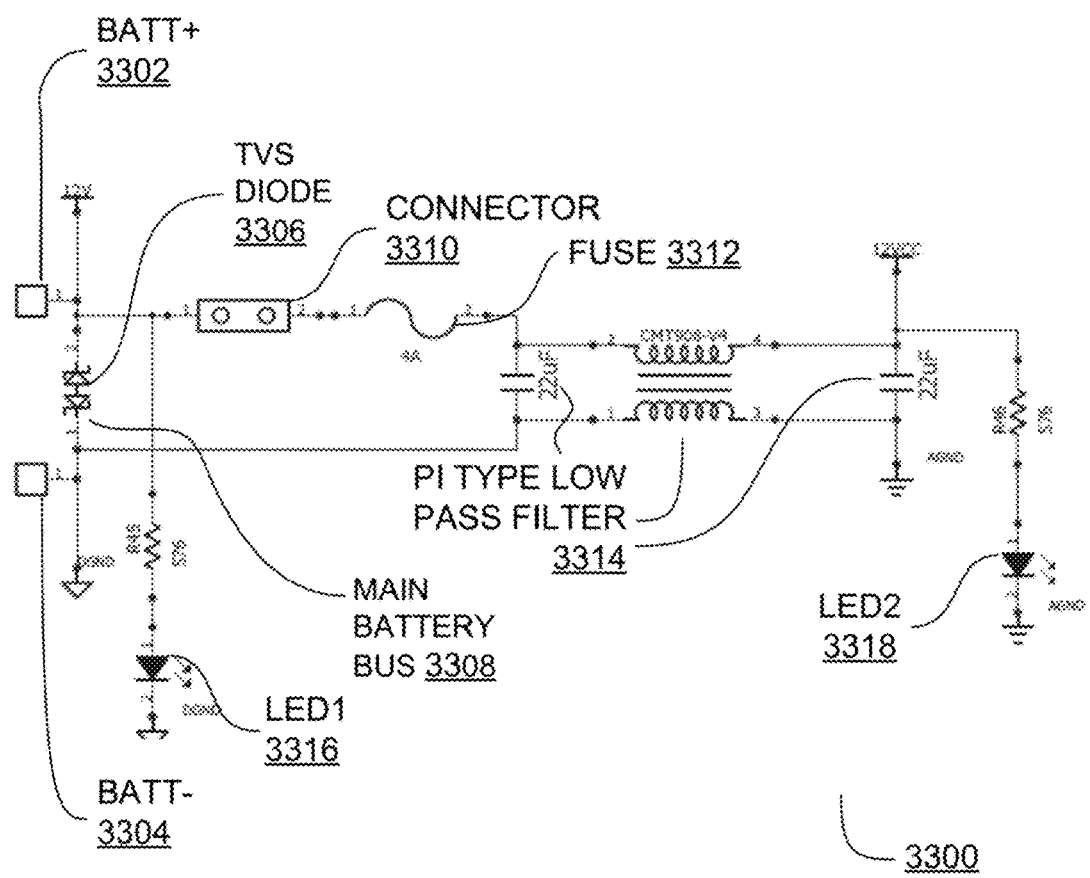
FIG. 33 is a schematic of an input power filter, according to an implementation.

FIG. 33 is a schematic of an input power filter 3300, according to an implementation. The input power filter 3300 includes two 12V battery terminals. The terminals include a positive terminal, BATT+ 3302, and negative terminal, BATT− 3304. The input power filter 3300 also includes a bidirectional transient voltage suppression (TVS) diode 3306 which prevents noise on the main battery bus 3308 from propagating into the electric circuits. Connector 3310 connects the power from either the battery or another external power source to the rest circuit. A fuse 3312 is included on the input power filter 3300 to protect from a catastrophic failure. The input power filter 3300 also includes a pi type low pass filter 3314, which prevents motor noise from interfering with the electric circuit. LED1 3316 and LED2 3318 are light emitting diodes which indicate whether power is present on the circuit.

Figure 34:
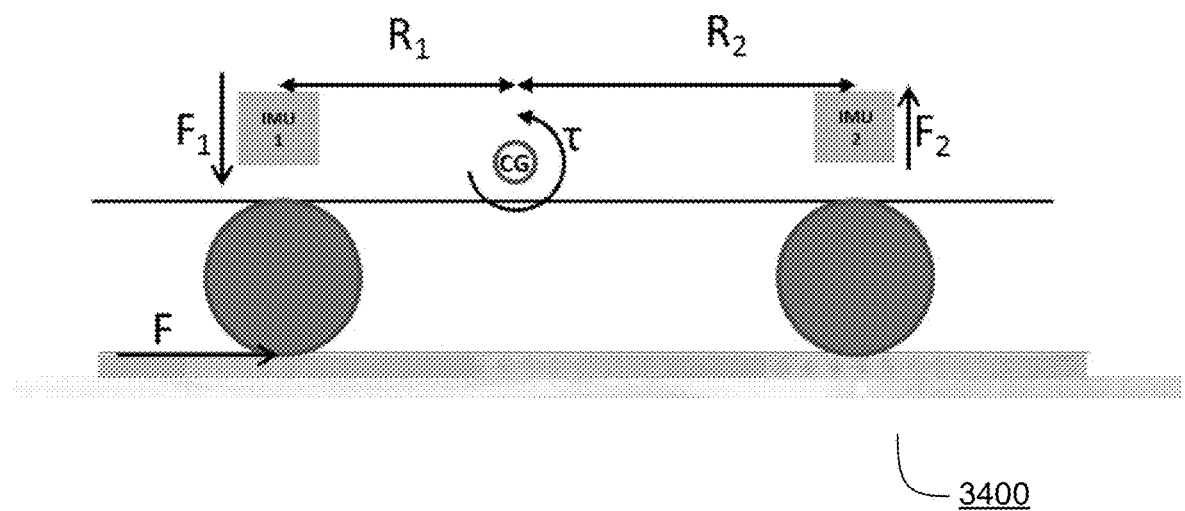
FIG. 34 is a model of an accelerating vehicle, according to some implementation.

FIG. 34 is a model of an accelerating vehicle, according to some implementation. The vehicle is moving from left to right driven by the force, F. This force causes a counter-clockwise torque to act about the CG, tending to pull the front of the vehicle up and push the rear of the vehicle down. The force F1 adds to the force of gravity and causes an increase in acceleration to be measured by IMUL F2 subtracts from the force of gravity and causes a decrease in acceleration to be measured by IMU2. Force is related to torque by the relation $T=F1 \times R1=F2 \times R2$, where F and R are vectors and x is the cross product. Knowing F1 and F2 we can calculate R1 and R2 (R1+R2 being a known value) and fix the position of the CG between the front and rear of the vehicle. Similarly by measuring the centrifugal forces at the two front wheels we can fix the location of the CG between the left and right sides of the vehicle. This allows the vehicle 200 to calculate in real time any change to the CG from, for instance, various drivers and cargo. With this capability the Lean mechanism controller 206 is better able to calculate safety margins for braking and turning maneuvers.

Figure 35:
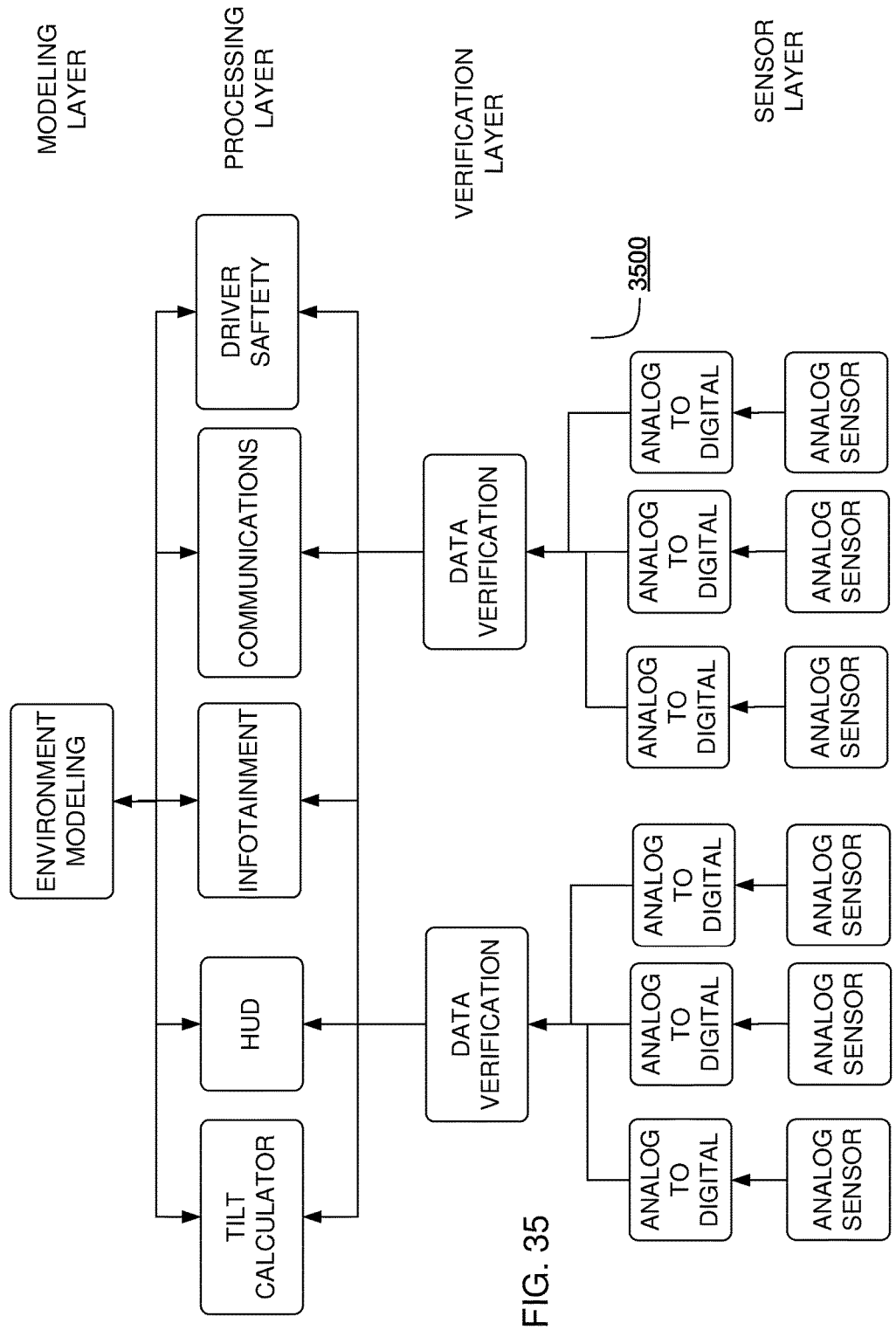
FIG. 35 is a block diagram of a LMC that uses a layered hierarchy, according to some implementation.

FIG. 35 is a block diagram of a LMC 3500 that uses a layered hierarchy, according to some implementation.

The lowest layer is the Sensor Layer. This layer includes of electronic and electro-mechanical sensors and the additional signal processing circuitry that is required to convert the sensor measurements into serial digital data.

The next level is the Verification Layer. This layer determines the veracity of the sensor data by comparing redundant sensor measurements. Once the data is verified, additional processing is employed to extract the data required for the various elements of the higher layers. For instance, the output of an IMU sensor may be correlated with engine vibration data to remove the engine vibration from the acceleration data. Data is sampled and averaged at different rates depending on the end disclosure for the data. For instance, wheel rotation may be sampled at a very high rate to detect wheel slipping, but at a much lower rate to provide vehicle speed information to the HUD.

The next level is the Processing Layer. This layer utilizes the data from the Verification Layer to perform high level processing functions, such as driving the Lean Actuator, controlling the HUD, adjusting the sound quality and volume of the audio system, generating operating status and caution and warning alarms, etc.

The highest level is the Modeling Layer. This layer creates a virtual model of the entire environment of vehicle 200, analogous to the driver's sensory experience. This model includes knowledge of the operation of all elements of the vehicle 200 as well as knowledge of the immediate environment around the vehicle from both real time information (from cameras, radar, etc.) and stored information from previous trips (by this vehicle 200 or any other vehicle 200), augmented by available disclosures such as GPS, traffic and weather reporting, etc.

The knowledge accumulated in the Modeling Layer is passed back down to the Processing Layer to augment the sensor based processing to adapt intelligently to environmental conditions. Examples of this behavior may include warning the driver of imminent traffic problems, tuning down the Lean Actuator in high wind conditions or adjusting the suspension for an upcoming section of rough road.

The vehicle 200 employs a variety of sensors to monitor the environment in and around the vehicle. This allows the LMC to create and maintain a computer model analogous to what the driver experiences. In this way the LMC can adapt various control parameters to changing requirements. These sensors are described below.

The vehicle 200 MEMS sensors have already been noted above as providing inputs to the calculation of the tilt angle and automatic CG calculation. These sensors include the IMU, with triaxial angular rate and acceleration measurement. In addition to providing inputs for the calculation of the tilt angle, these sensors provide information on road incline and banking, road surface smoothness, engine vibration, and aerodynamic effects such as wind gusting.

Each wheel of the vehicle 200 is equipped with a rotational speed sensor. These may be in the form of magnetic proximity encoders, resolvers, or magnetic rotation sensors. Knowing the rotational speed of each wheel allows the vehicle 200 to detect wheel lock for anti-lock braking, and wheel slip for active traction control on wet or icy road surfaces. In addition wheel speed is used for calculating vehicle speed, acceleration and deceleration, also inputs to the tilt angle calculation.

The vehicle 200 employs magnetic sensors to detect the geomagnetic field of the Earth in order to determine compass heading. This is used in conjunction with the GPS and map system to create a model of the location and direction of the vehicle on the road. Corrections to the magnetic heading are applied from a look up table based on the latitude and longitude coordinates from the GPS in order to provide compass headings.

The vehicle 200 employs various video cameras to aid in driving and navigation. A forward looking camera is used to adjust the adaptive headlight system, allowing individual lighting elements to be dimmed to protect the drivers of nearby vehicles from glare, while maintaining the brightest lighting for driver of the vehicle 200. The forward looking camera is also used in conjunction with the GPS and map systems to anticipate upcoming turns and curves in the road. The vehicle 200 employs a rear facing camera to provide maximum rearward visibility while driving, and to facilitate parking. The rear facing camera is one element of the Heads Up Display (HUD). Both the forward facing and rear facing cameras are used in conjunction with the Radar System for detecting potentially dangerous traffic and obstacles. The video cameras may be sensitive to either visible or infrared light.

The vehicle 200 has the capability of transferring sensor data to and from remote third party servers (commonly referred to as "the cloud") via wireless cellular telephony. This capability has at least two disclosures, described below. The cloud data is configurable and can include anything from location or speed information to a complete record of all vehicle 200 sensors, including video. This data includes inputs from all sensors noted above, as well as common engine functions such as tachometer, fuel consumption, battery voltage, coolant temperatures and oil pressure. This allows the driver a complete record of trips, and most usefully, racing track information. Use of the cloud also allows the vehicle 200 to download sensor and route information in real time from previous trips, and from other vehicle 200 owners.

The vehicle 200 has the ability to store sensor information recorded while driving. This data can be recorded locally in the memory of the LMC, or uploaded to the cloud. Utilizing this data in conjunction with the GPS and map system allows the vehicle 200 to create a detailed model of a particular route. In one instance this allows a driver to improve his track performance in real time lap to lap, as the LMC adapts control parameters and safety margins to take advantage of foreknowledge of the track geometry and conditions. In another instance this allows the commuter to improve fuel efficiency as the LMC adapts to a daily traffic routine with foreknowledge of typical traffic patterns and road speeds. In another instance this allows the LMC to adapt to the driving habits of a particular operator of vehicle 200, adjusting control parameters and safety margins based on the driving habits (acceleration/deceleration, turning speed, reaction time, etc.) of the driver. In another instance this allows the LMC to detect an impairment of the driver (or a malfunction of the vehicle 200 itself), if the driver is having difficulty maintaining the typical driving pattern learned from previously driving the same route. The LMC can then adjust control parameters and increase safety margins to compensate, and even shut down if required.

Figure 36:
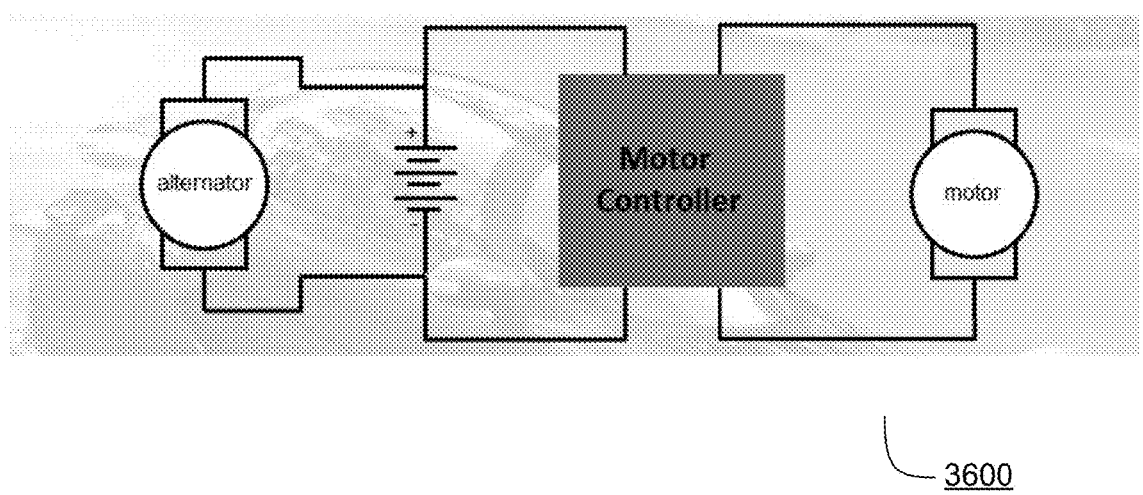
FIG. 36 is a block diagram of a single voltage system in some implementations in which the battery voltage is also the motor voltage.

FIG. 36 is a block diagram of a single voltage system 3600 in some implementations in which the battery voltage is also the motor voltage. The battery is discharged into the motor through a control computer and is recharged from an alternator powered by the vehicle engine. The battery voltage can be any practical value. In an implementation the battery voltage is 12V, 24V or 48V. In this system the battery acts as a reservoir supplying the lean actuator motor with short bursts of high current for turning, and is recharged continuously at a lower current.

Figure 37:
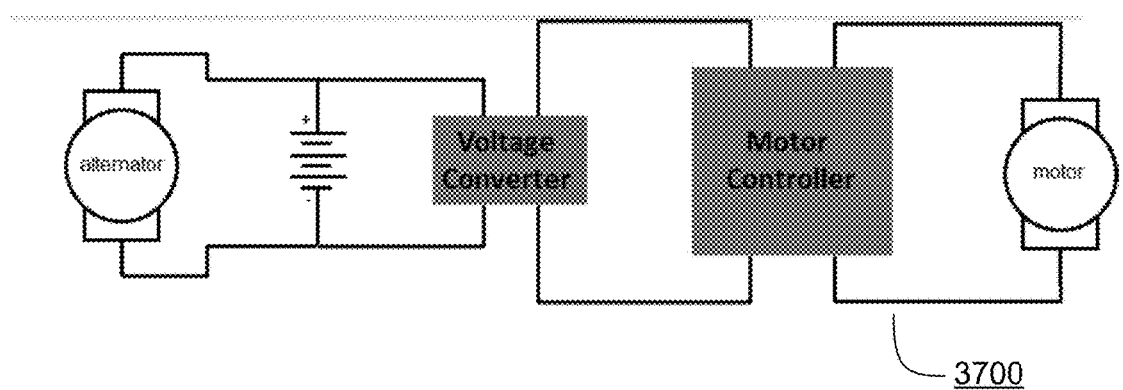
FIG. 37 is a block diagram of a voltage conversion system, according to an implementation in which a primary battery voltage is converted to a higher secondary voltage for motor operation.

FIG. 37 is a block diagram of a voltage conversion system 3700, according to an implementation in which a primary battery voltage is converted to a higher secondary voltage for motor operation. In an implementation of system 3100 the secondary voltage would be 90 VDC to 300 VDC, or 200 VAC to 240 VAC, either 50 Hz or 60 Hz. The higher voltage makes it possible to use a smaller motor and smaller gauge wiring. In this system the battery acts as a reservoir supplying the lean actuator motor with short bursts of high current for turning, and is recharged continuously at a lower current.

In a dual battery system, the primary voltage (typically 12V) is converted to a higher voltage (typically 48 VDC to 96 VDC) for charging the secondary battery. The primary batter is optional in this system but is shown for completeness. The primary voltage alternator is used for continuous charging of the secondary battery through the voltage converter. The secondary battery supplies large amounts of current in short bursts to the motor during turns.

The vehicle 200 is equipped with a WIFI Ethernet capability for communicating with other nearby vehicles that are equipped with WIFI Ethernet capability. This allows the formation of traveling convoys of vehicle 200 for travel to cycling events or other purposes. By sharing sensor information from vehicle to vehicle speeds and spacing can be matched precisely, with one vehicle 200 being the "master" and the others being "slaves" as a form of convoy cruise control. In addition, road conditions from vehicles at the front of the convoy can be communicated to vehicles further back allowing the further back vehicles some foreknowledge or curves, rough road, sudden traffic stops, etc. The WIFI also allows owners of vehicle 200 to communicate using audio, and allows the transfer of the forward looking video from the leading vehicles to the HUD of vehicles further back.

Figure 38:
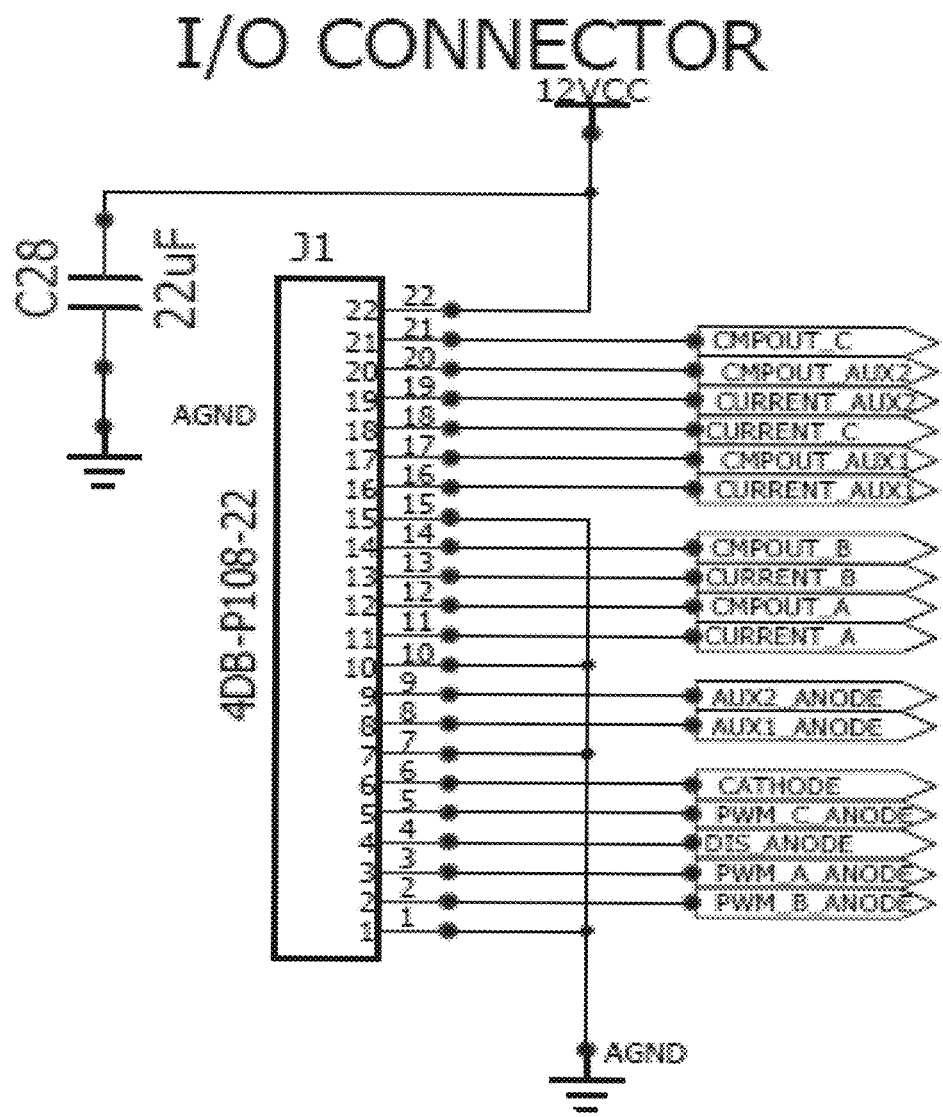
FIG. 38 is a schematic of an electrical circuit, according to an implementation.

FIG. 38 is a schematic of an electrical circuit, according to an implementation.

Figure 39:
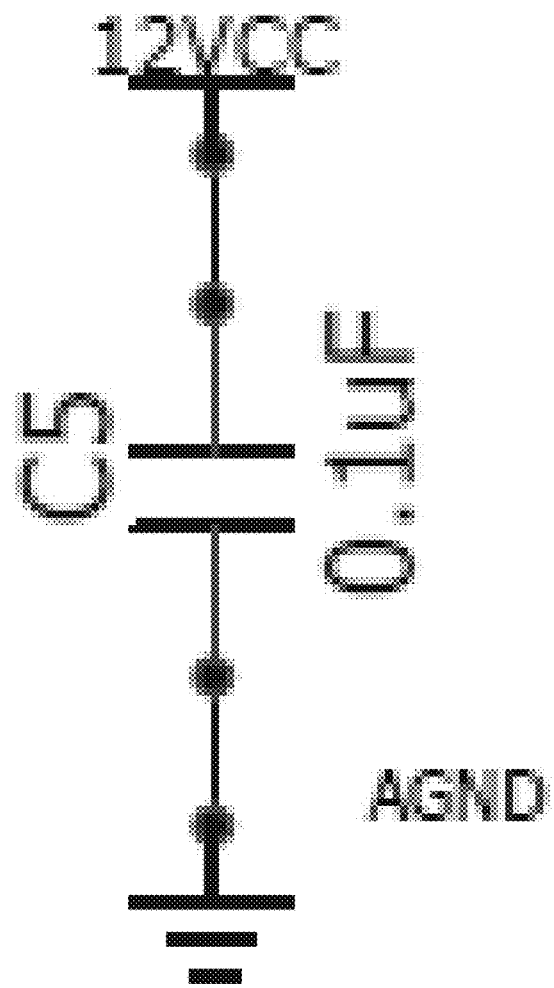
FIG. 39 is a schematic of a decoupling capacitor, according to an implementation.

FIG. 39 is a schematic of a decoupling capacitor 3900, according to an implementation. The decoupling capacitor 3900 provides instantaneous current to nearby circuitry. The instantaneous current prevents the inductance of the circuit board and wiring from creating noise in the circuitry. Every integrated circuit component on the board has one or more of these nearby its supply voltage pin.

Figure 40:
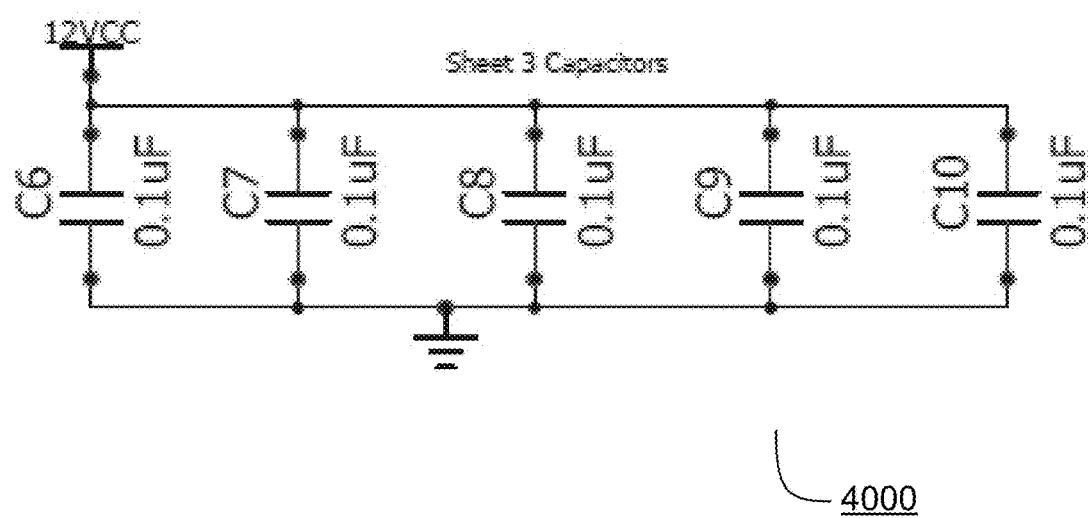
FIG. 40 is a schematic of a decoupling capacitor, according to an implementation.

FIG. 40 is a schematic of a decoupling capacitor 4000, according to an implementation. The decoupling capacitor 4000 provides instantaneous current to nearby circuitry. The instantaneous current prevents the inductance of the circuit board and wiring from creating noise in the circuitry. Every integrated circuit component on the board has one or more of these nearby its supply voltage pin.

Figure 41:
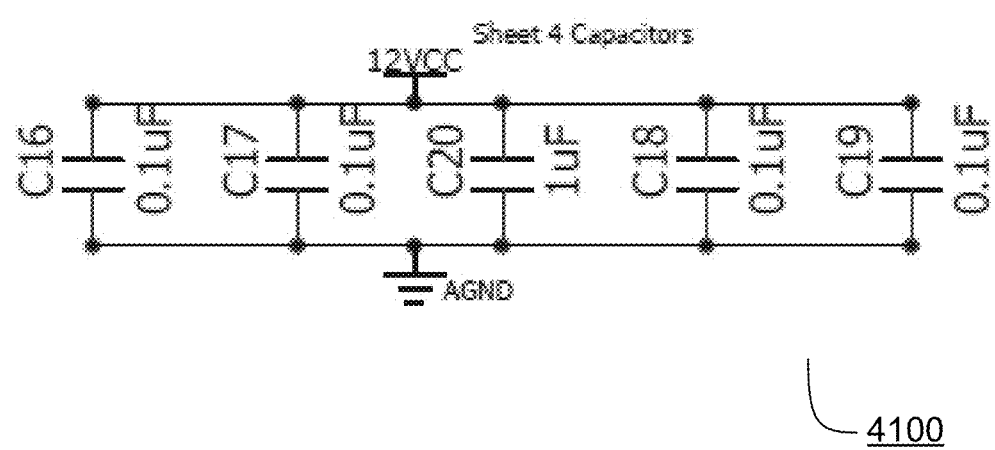
FIG. 41 is a schematic of a decoupling capacitor, according to an implementation.

FIG. 41 is a schematic of a decoupling capacitor 4100, according to an implementation. The decoupling capacitor 4100 provides instantaneous current to nearby circuitry. The instantaneous current prevents the inductance of the circuit board and wiring from creating noise in the circuitry. Every integrated circuit component on the board has one or more of these nearby its supply voltage pin.

Figure 42:
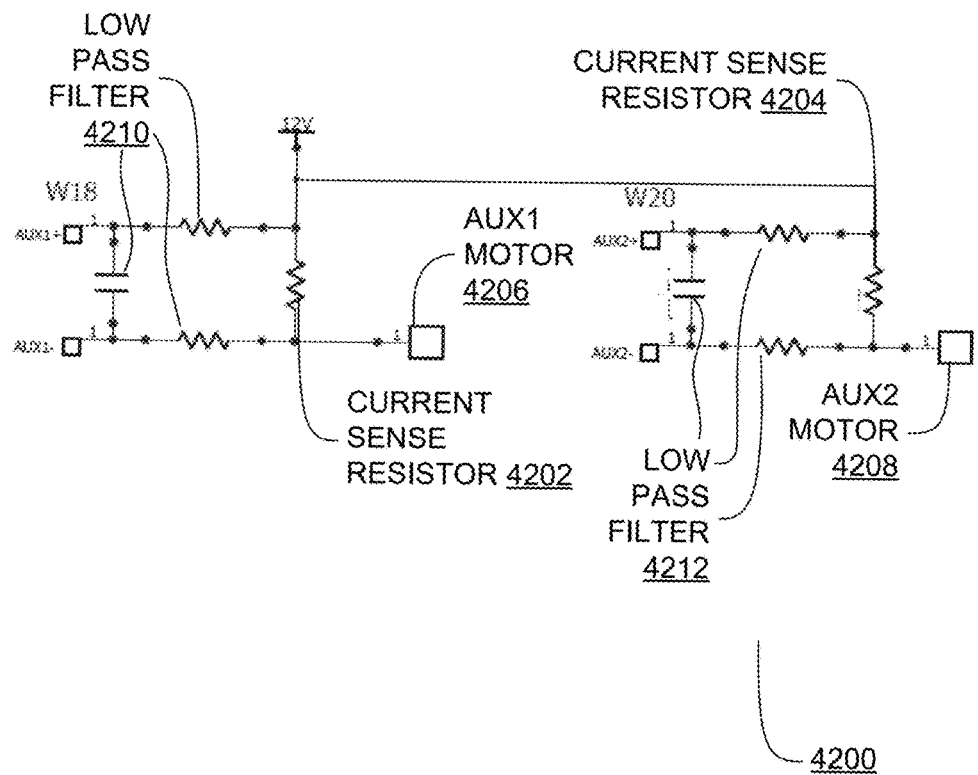
FIG. 42 is a schematic of an input circuit for motor current monitoring, according to an implementation.

FIG. 42 is a schematic of an input circuit 4200 for motor current monitoring, according to an implementation. The input circuit 4200 includes two current sense resistors, 4202 and 4204 for AUX1 motor 4206 and AUX2 motor 4208. The input circuit of the single voltage system 3600 also includes two low pass filters, 4210 and 4212, on each circuit.

Figure 43:
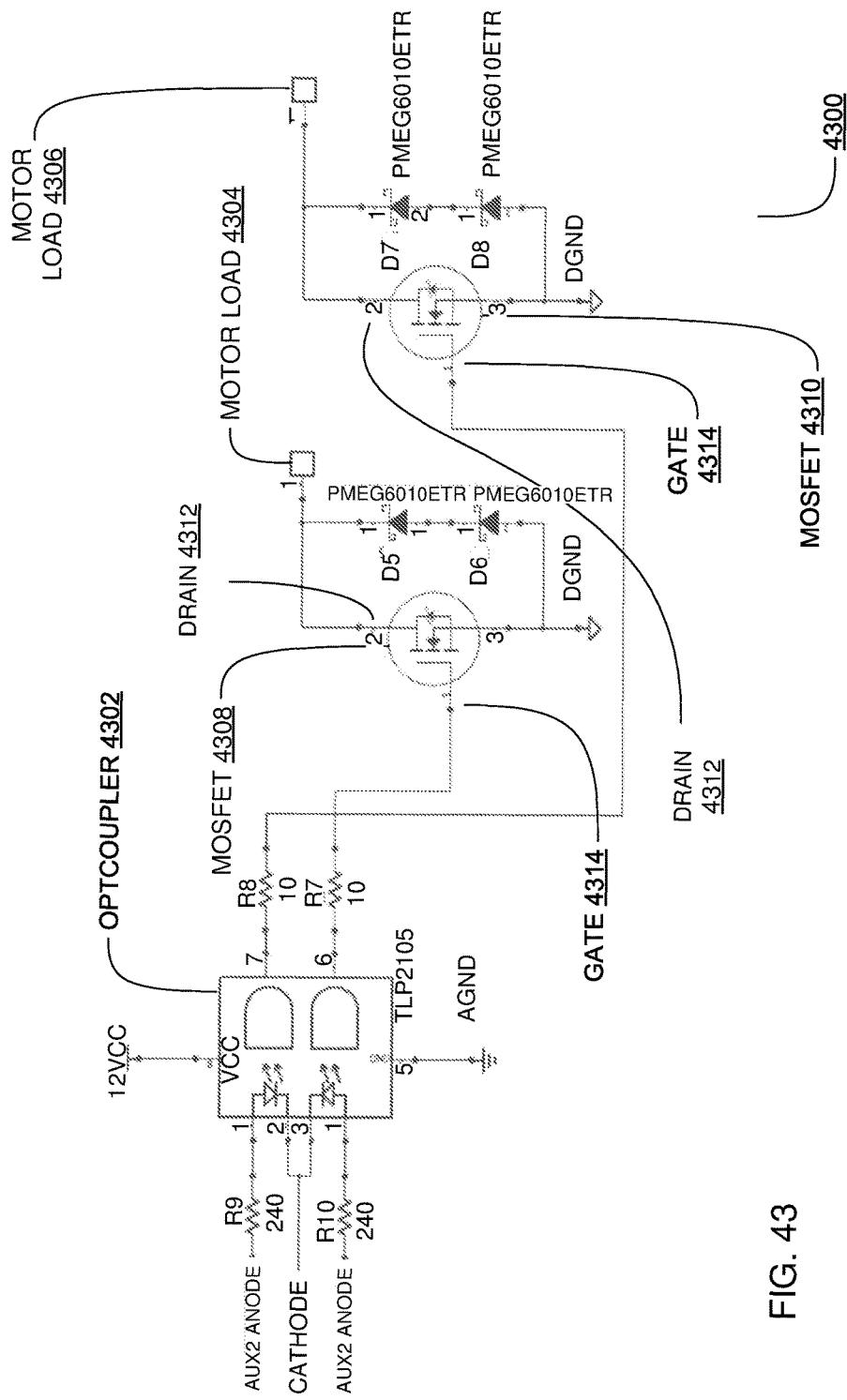
FIG. 43 is a schematic of switches on the motor drive board, according to an implementation.

FIG. 43 is a schematic of switches 4300 on the motor drive board, according to an implementation. The switches 4300 include an optocoupler 3702 which receives PWM signals from a control computer. The PWM signals control the single ended motor loads 4304 and 4306. The switches 4300 also includes MOSFET switches 4308 and 4310. With one terminal of a brushed motor connected to 12V through the circuit of FIG. 42 and the other terminal connected to the drain 4312 of Q1 or Q2, driving a positive voltage into the gate 4314 of the MOSFET switches 4308 and 4310 closes the switch and current flows through the motor.

Figure 44:
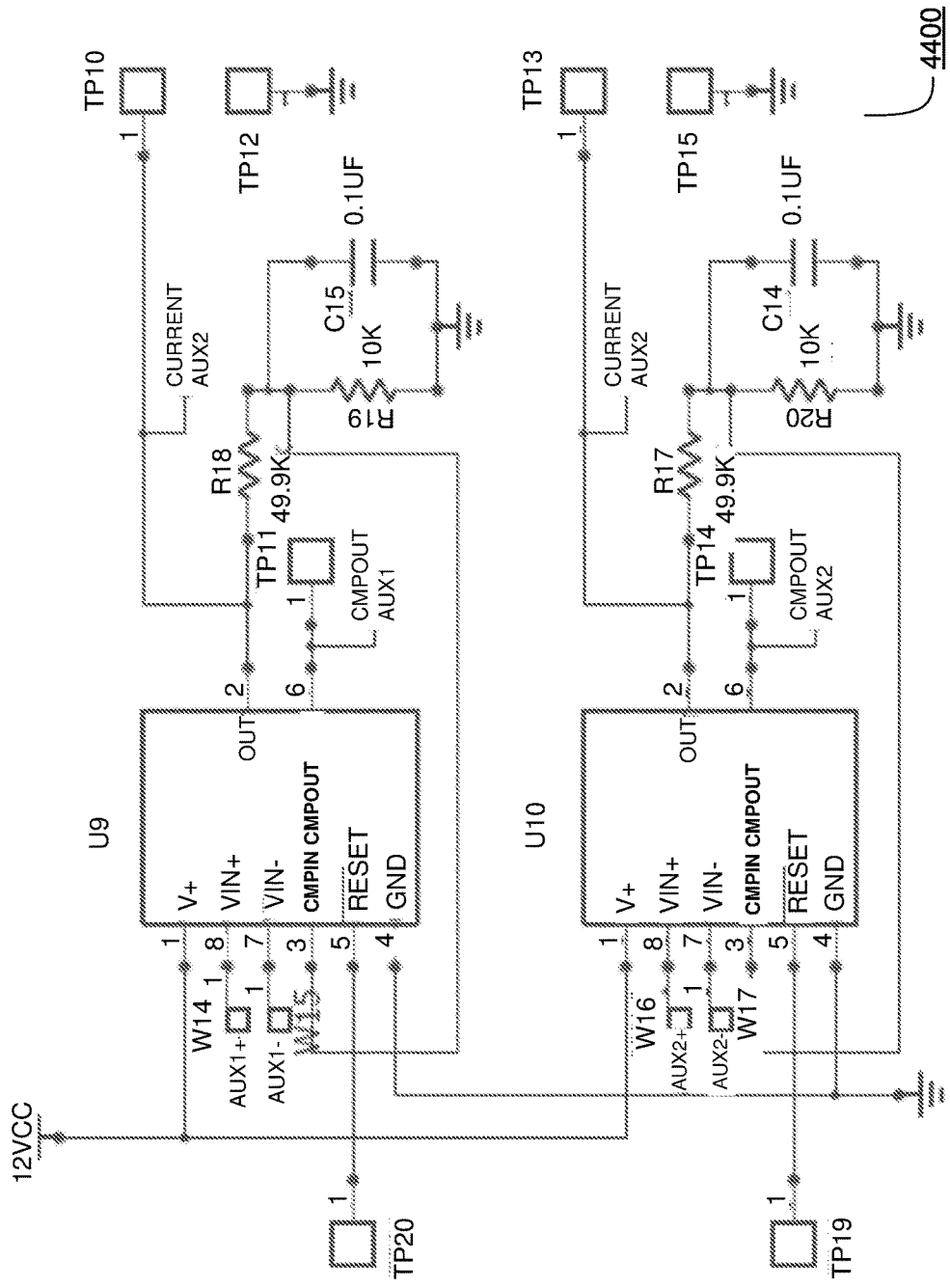
FIG. 44 is a schematic of current monitors for the switches on the motor drive board, according to an implementation.

FIG. 44 is a schematic of current monitors 4400 for the switches on the motor drive board, according to an implementation. The filtered current sense voltage is applied to the VIN+ and VIN− inputs of U9, where it is amplified by a gain of 20. The CMPOUT signal (pin 6) is a warning signal that indicates that the motor current has exceeded a threshold set by the ratio of resistors R18 and R19. An identical circuit exists for the AUX2 motor.

Figure 45:
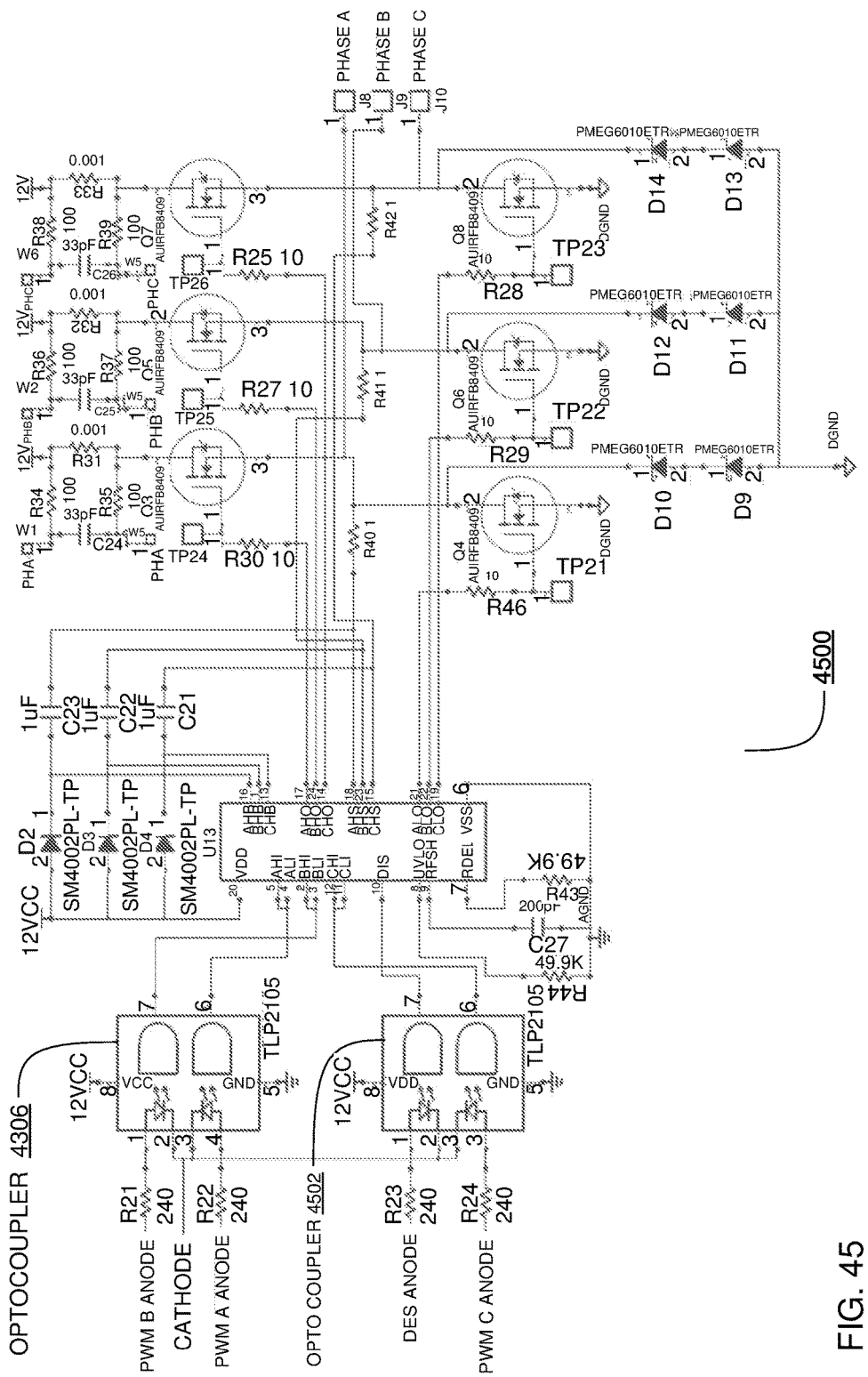
FIG. 45 is a schematic of 3 phase motor controller, according to an implementation.

FIG. 45 is a schematic of 3 phase motor controller 4500, according to an implementation. FIG. 45-U11 and U12 are optocouplers. They receive the PWM signals for motor phases A, B and C from the control computer. The purpose of an optocoupler is to transmit a signal across an electrical boundary using a light emitting diode and photo sensitive receiver. This keeps switching noise from the motor windings from interfering with the voltages on the control computer. U11 receives the PWM signals for phase A and phase B, U12 receives the PWM signal for phase C, and the motor disable signal. U13 is the PWM generator. It takes the three PWM signals and the disable signal from U11 and U12 and converts them into drive voltages for the three phase H-Bridge (Q3 thru Q8). An H-bridge is a common way of applying voltage to loads such as motors. Each of the three phases of the motor (A,B,C) is connected to one pair of MOSFET transistor switches. Phase A is connected to Q3,Q4; Phase B is connected to Q5,Q6; Phase C is connected to Q7, Q8. Turning on one (and only one) transistor in each pair allows each motor phase to be connected to either 12V or 0V. The different motor phases are exciting in the proper sequence to make the motor turn. This is a standard technique for driving brushless DC motors. The three low side transistors, Q4, Q6, and Q8, are each turned on by applying a voltage (~10V) to the gate pin (pin 1). This voltage comes from U13, following the PWM inputs from the control computer. The diodes D2-D4 and the capacitors C21-C23, form a bootstrapping circuit for U13. The purpose of this circuit is to create a gate voltage for the three high side transistors, Q3, Q5, and Q7. Since these transistors are on the high side of the motor winding, the output of each (the source, pin 3) is at 12V when the switch is on. In order to drive the gate 10V higher than the source and gate voltage of ~22 volts is required. The bootstrap circuit creates this voltage in the following way: When Q4 is closed, the pin AHS is pulled to 0V. This charges the capacitor C23 through the diode D2 to ~10V. When Q4 is opened and Q3 is closed, the pin AHS is pulled to 12V and the voltage at pin AHB is now 10V+12V=22V. This voltage is made available in U13 to drive the gates of the high side transistors. Phases B and C work likewise. The diodes D9 thru D14 are Schottky type high speed diodes. Their purpose is to supply a path to ground for the large negative voltages that occur when a (highly inductive) motor phase is switched off. They protect the low side transistors. The resistor R31 is the current sense resistor for Phase A. With a value of 0.001 ohm, it generates a voltage of 0.001 times the current through Phase A, or 0.1V for 100 amps. The resistors R34, R35 and the capacitor C24 form a low pass filter to remove some of the high frequency switching noise from the current sense voltage. Phases B and C have identical circuits.

Figure 46:
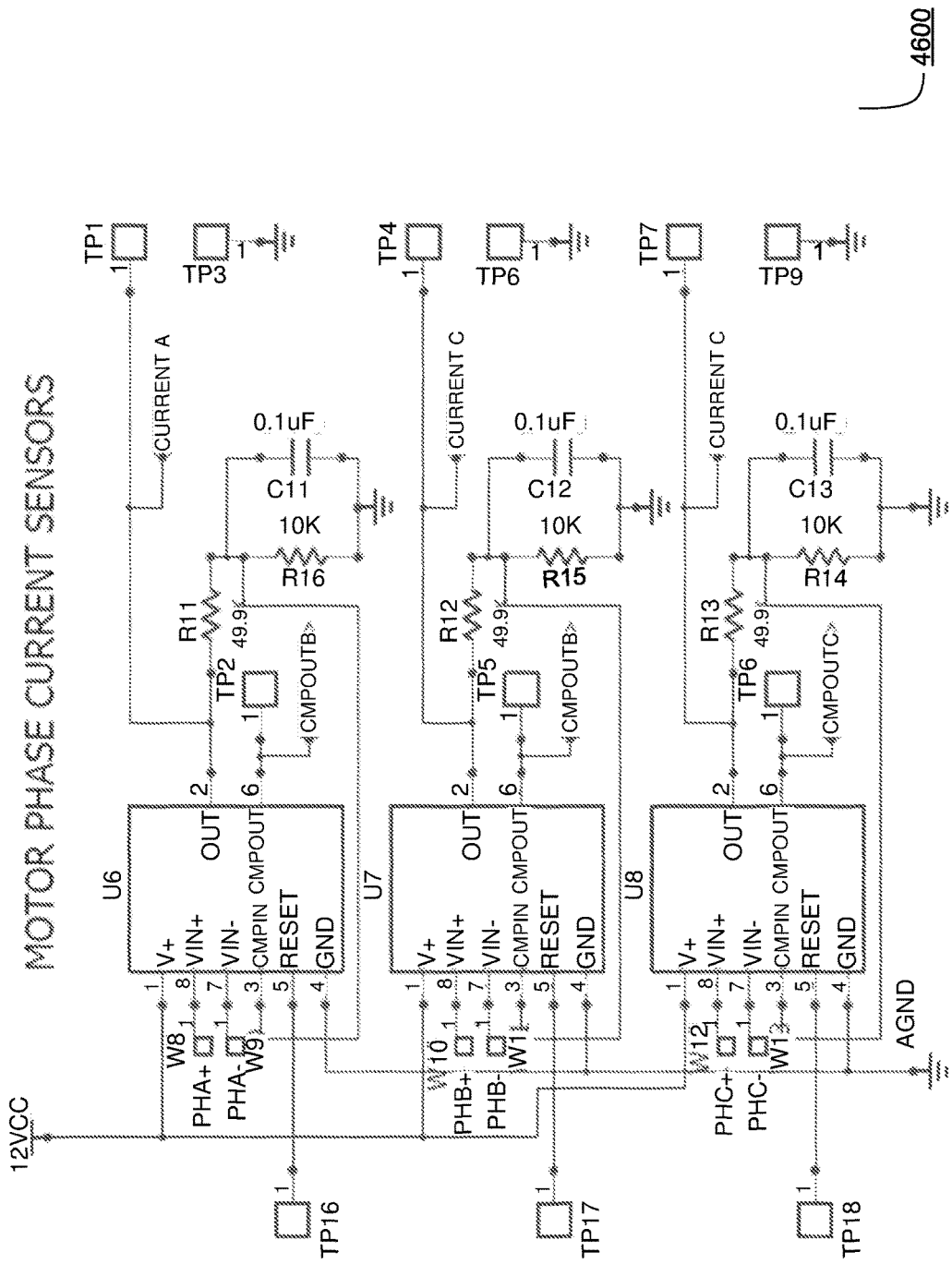
FIG. 46 is a schematic of motor current monitors, according to an implementation.

FIG. 46 is a schematic of motor current monitors 4600, according to an implementation. Continuing with Phase A, the filtered voltage across R31 in FIG. 46 is applied between the VIN+ and VIN− inputs of U6. U6 is a current sense amplifier and multiplies the current sense voltage by a factor of 20, so a 100 amp motor current (0.1V current sense voltage) will result in a 2V output. This output signal (CURRENT_A) is sent to the control computer board to be used in the control computer. Pin 6 is a comparator output that sends an over current warning signal in the event that the motor current is too high. The threshold for this warning current is set by the ratio of the resistors R11 and R16. Phase B and C have identical circuits.

Hardware and Operating Environment

Figure 47:
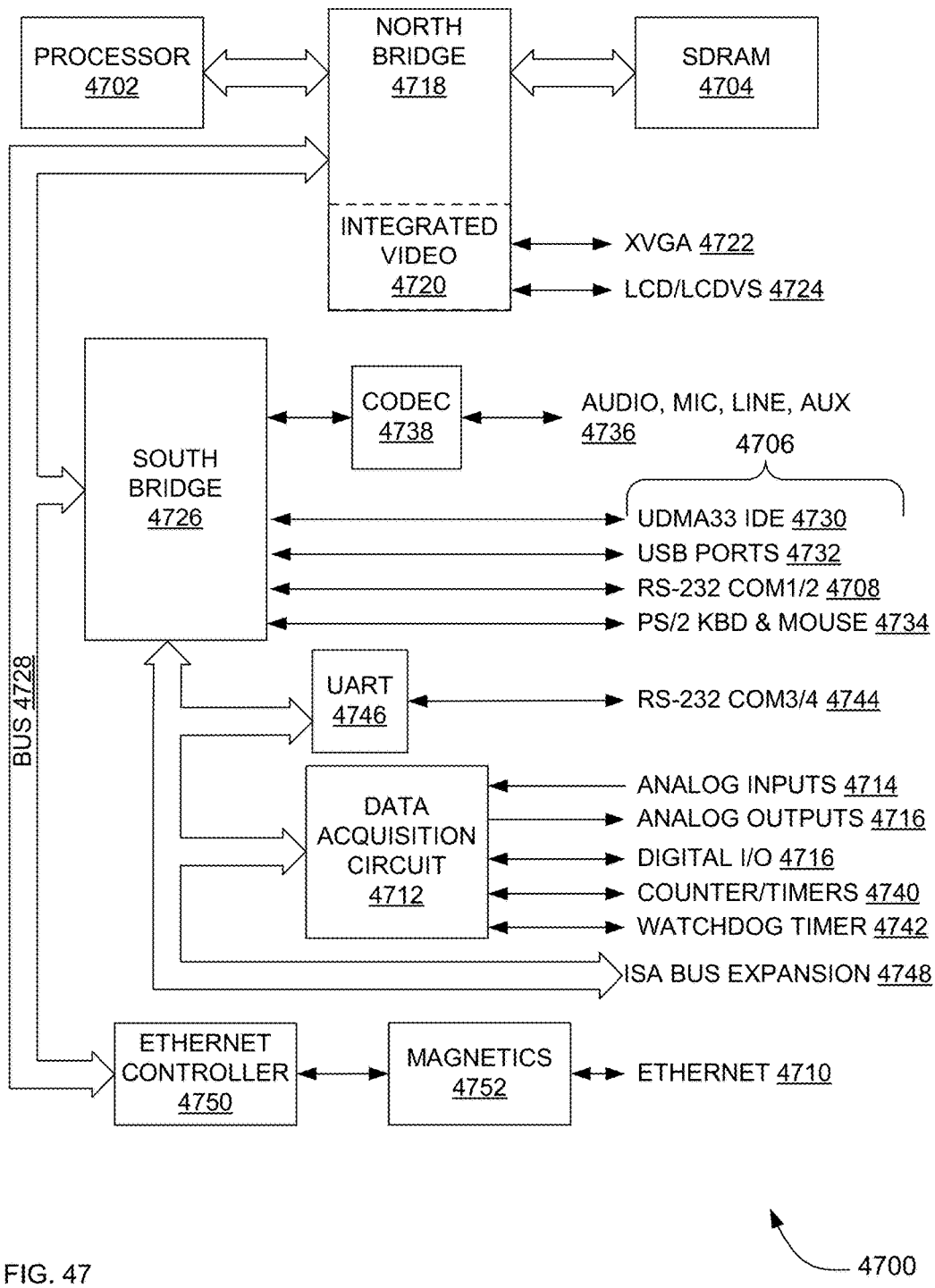
FIG. 47 is a block diagram of a control computer in which different methods can be practiced.

The description of FIG. 47 provides an overview of electrical hardware and suitable computing environments in conjunction with which some implementations can be implemented. Implementations are described in terms of a computer executing computer-executable instructions. However, some implementations can be implemented entirely in computer hardware in which the computer-executable instructions are implemented in read-only memory. Some implementations can also be implemented in client/server computing environments where remote devices that perform tasks are linked through a communications network. Program modules can be located in both local and remote memory storage devices in a distributed computing environment.

FIG. 47 is a block diagram of a control computer 4700 in which different implementations can be practiced. The control computer 4700 includes a processor (such as a Pentium III processor from Intel Corp. in this example) which includes dynamic and static ram and non-volatile program read-only-memory (not shown), operating memory 4704 (SDRAM in this example), communication ports 4706 (e.g., RS-232 port 4708 COM1/2 or Ethernet port 4710), and a data acquisition circuit 4712 with analog inputs 4714 and outputs and digital inputs and outputs 4716.

In some implementations of the control computer 4700, the data acquisition circuit 4712 is also coupled to counter timer ports 4740 and watchdog timer ports 4742. In some implementations of the control computer 4700, an RS-232 port 4744 is coupled through a universal asynchronous receiver/transmitter (UART) 4746 to a bridge 4726.

In some implementations of the control computer 4700, the Ethernet port 4710 is coupled to the bus 4728 through an Ethernet controller 4750.

With proper digital amplifiers and analog signal conditioners, the control computer 4700 can be programmed to drive coolant control gate valves, either in a predetermined sequence, or interactively modify coolant flow by opening and closing (or modulating) coolant control valve positions, in response to engine or coolant temperatures. The engine temperatures (or coolant temperatures) can be monitored by thermal sensors, the output of which, after passing through appropriate signal conditioners, can be read by the analog to digital converters that are part of the data acquisition circuit 4712. Thus the coolant or engine temperatures can be made available as information/data upon which the coolant application program can operate as part of decision-making software that acts to modulate coolant valve position in order to maintain the proper coolant and engine temperature.

CONCLUSION

A tilting two-front-one-rear vehicle is described. A technical effect of the coordinated tilting of a vehicle during turns. Although specific implementations are illustrated and described herein, it will be appreciated by those of ordinary skill in the art that any arrangement which is calculated to achieve the same purpose may be substituted for the specific implementations shown. This disclosure is intended to cover any adaptations or variations. For example, although described in tricycle terms, one of ordinary skill in the art will appreciate that implementations can be made in automobiles or any other vehicle that provides the required function.

In particular, one of skill in the art will readily appreciate that the names of the methods and apparatus are not intended to limit implementations. Furthermore, additional methods and apparatus can be added to the components, functions can be rearranged among the components, and new components to correspond to future enhancements and physical devices used in implementations can be introduced without departing from the scope of implementations. One of skill in the art will readily recognize that implementations are applicable to future sensor devices, different tricycles, and new microprocessors.

The terminology used in this disclosure meant to include all transportation and vehicle environments and alternate technologies which provide the same functionality as described herein.

The invention claimed is:

1. A motorized vehicle comprising:
a frame;
two front wheels operably coupled to the frame;
two rear wheels operably coupled to the frame;
a suspension system operably coupled to one of the wheels, the suspension system including a lean actuator in which one end of the lean actuator is connected to the frame, the lean actuator being configured to tilt the frame of the motorized vehicle;

a plurality of inertial measurement unit sensors, one of which is operably coupled to the frame near a center of gravity of the motorized vehicle, each of the plurality of inertial measurement unit sensors perform measurement of acceleration in three axes, angular rate in three axes, and measures magnetic field in at least one axis;

a lean mechanism controller that is operably coupled to the lean actuator of the suspension system, the lean mechanism controller including a sensor layer that is operably coupled to the plurality of inertial measurement unit sensors, a verification layer that is operably coupled to the sensor layer and that includes a component that determines accuracy of data from the sensor layer by comparing redundant measurements from the sensor layer; and an active system that is operably coupled to the lean mechanism controller that operates in two modes:

a first mode being an autonomous mode in which the active system includes a first component that generates a signal to tilt the motorized vehicle in response to lateral forces so that a resultant force acts through the center of gravity of the motorized vehicle in line with a central axis of the motorized vehicle that simulates intuitive motorcycle rider's actions, the signal being generated from the plurality of inertial measurement unit sensors, the signal being generated independent of steering inputs, and a second component that is coupled to the first component that sends the signal to the lean mechanism controller, the lateral forces including turning forces and effects of wind or unlevel terrain, the active system also including a third component that is coupled to the first component and that determines magnetic heading, road incline and smoothness, braking and acceleration forces, aerodynamic forces, skid and hydroplaning from data from the plurality of inertial measurement unit sensors, and a second mode being an interactive mode in which the active system includes a fourth component that detects a lean of a body of a human and a fifth component that generates a signal to tilt the motorized vehicle in response to lateral forces so that a resultant force acts through the center of gravity of the motorized vehicle in line with a central axis of the motorized vehicle that simulates intuitive motorcycle rider's actions, the signal being generated from the signal that is indicative of interaction with the human and from data from the plurality of inertial measurement unit sensors and the plurality of inertial measurement unit sensors, and the second component that is coupled to the fifth component that sends the signal to the lean mechanism controller.

2. The motorized vehicle of claim 1 further comprising:
a steering wheel operably coupled to one of the wheels.

3. The motorized vehicle of claim 1 further comprising:
a motorcycle saddle seat;
handlebar motorcycle controls; and
an enclosable cockpit.

4. The motorized vehicle of claim 1 further comprising:
a cockpit;
a saddle seat;
motorcycle controls; and
an enclosable open configuration.

5. The motorized vehicle of claim 1 further comprising:
a seat.

6. The motorized vehicle of claim 1 wherein the frame further comprises:
a modular frame.

7. The motorized vehicle of claim 1 wherein the inertial measurement unit sensors further comprise:
a forward looking sensor that is mechanically coupled to the frame and that is operably coupled to the active system.

8. A motorized vehicle comprising:
a frame;
two front wheels operably coupled to the frame;
two rear wheels operably coupled to the frame;
a suspension system operably coupled to one of the wheels, the suspension system including an electronic suspension system in which one end of the electronic suspension system is connected to the frame, the electronic suspension system being configured to tilt the frame of the motorized vehicle;
a plurality of inertial measurement unit sensors, one of which is operably coupled to the frame near a center of gravity of the motorized vehicle, each of the plurality of inertial measurement unit sensors perform measurement of acceleration in three axes, angular rate in three axes, and measures magnetic field in at least one axis;
a lean mechanism controller that is operably coupled to the electronic suspension system of the suspension system, the lean mechanism controller including a sensor layer that is operably coupled to the plurality of inertial measurement unit sensors, a verification layer that is operably coupled to the sensor layer and that includes a component that determines accuracy of data from the sensor layer by comparing redundant measurements from the sensor layer; and
an active system that is operably coupled to the lean mechanism controller that operates in two modes:
a first mode being an autonomous mode in which the active system includes a first component that generates a signal to tilt the motorized vehicle in response to lateral forces so that a resultant force acts through the center of gravity of the motorized vehicle in line with a central axis of the motorized vehicle that simulates intuitive motorcycle rider's actions, the signal being generated from the plurality of inertial measurement unit sensors, the signal being generated independent of steering inputs, and a second component that is coupled to the first component that sends the signal to the lean mechanism controller, the lateral forces including turning forces and effects of wind or unlevel terrain, the active system also including a third component that is coupled to the first component and that determines magnetic heading, road incline and smoothness, braking and acceleration forces, aerodynamic forces, skid and hydroplaning from data from the plurality of inertial measurement unit sensors, and
a second mode being an interactive mode in which the active system includes a fourth component that detects a lean of a body of a human and a fifth component that generates a signal to tilt the motorized vehicle in response to lateral forces so that a resultant force acts through the center of gravity of the motorized vehicle in line with a central axis of the motorized vehicle that simulates intuitive motorcycle rider's actions, the signal being generated from the signal that is indicative of interaction with the human and from data from the plurality of inertial measurement unit sensors and the plurality of inertial measurement unit sensors, and the second component that is coupled to the fifth component that sends the signal to the lean mechanism controller.

9. The motorized vehicle of claim 8 further comprising:
a steering wheel operably coupled to one of the wheels.

10. The motorized vehicle of claim 8 further comprising:
a motorcycle saddle seat;
handlebar motorcycle controls; and
an enclosable cockpit.

11. The motorized vehicle of claim 8 further comprising:
a cockpit;
a saddle seat;
motorcycle controls; and
an enclosable open configuration.

12. The motorized vehicle of claim 11 wherein the inertial measurement unit sensors further comprise:
a forward looking sensor that is mechanically coupled to the frame and that is operably coupled to the active system.

13. The motorized vehicle of claim 8 further comprising:
a seat.

14. The motorized vehicle of claim 8 wherein the frame further comprises:
a modular frame.

* * * * *